United States Patent [19]

Finster et al.

[11] 3,788,571

[45] Jan. 29, 1974

[54] TAPE CARTRIDGE LOADING AND POSITIONING SYSTEM

[75] Inventors: Leslie P. Finster, Ilion; Richard J. Petkovsek, Middleville; Trevor D. Reader, New Hartford; Warren A. Reynolds, Ilion; William A. Sours, Sauquoit, all of N.Y.

[73] Assignee: Cogar Corporation, Wappingers Falls, N.Y.

[22] Filed: Jan. 8, 1971

[21] Appl. No.: 104,933

[52] U.S. Cl. .................. 242/195, 226/92, 242/68.3, 242/197, 274/4 E

[51] Int. Cl. ...................... G11b 15/66, G11b 23/10

[58] Field of Search ... 242/195, 180, 181, 197, 198, 242/199, 200, 71.2, 68.3, 192, 210; 274/4 C, 4 D, 4 E, 4 B, 11 C, 11 D; 226/91, 92

[56] References Cited

UNITED STATES PATENTS

| | | | |
|---|---|---|---|
| 1,962,373 | 6/1934 | Wellman | 242/68.3 |
| 2,221,089 | 11/1940 | Githens et al. | 242/68.3 |
| 3,025,011 | 3/1962 | Camras | 242/195 X |
| 3,244,378 | 4/1966 | Rost | 242/181 |
| 3,275,256 | 9/1966 | Campbell, Jr. et al. | 242/197 |
| 3,458,158 | 7/1969 | Ohira | 242/198 |
| 3,539,131 | 11/1970 | Priest | 242/197 |
| 3,635,423 | 1/1972 | Lennie | 242/198 |

*Primary Examiner*—George F. Mautz
*Attorney, Agent, or Firm*—Harry M. Weiss; Gottlieb, Rackman & Reisman

[57] ABSTRACT

A tape deck utilizing a loader for properly positioning a tape cartridge is disclosed. The cartridge includes an internal supply reel which is adapted to rotate freely within the cartridge housing when the cartridge is mounted, by means of the loader, onto the supply drive spindle. A spring in the supply drive spindle forces the supply reel to assume the free rotation orientation during the mounting step. The loader, which is hinged to the tape deck, receives the cartridge therein when the loader is in its elevated "loading" position. The loader is then lowered down to the tape deck; the position of the cartridge within the loader is such that lowering the loader causes an eyelet attached to the recording tape in the supply reel of the cartridge to be affixed to a clasp attached to the permanent leader element coupled to the tape deck take-up reel. The loader is initially locked in place by the closing of a locking lever, which also serves to unblock the tape travel path by withdrawing a lug adjacent to the leader clasp. When tape advance commences, the movement of the leader clasp activates an auxiliary lock which, independently of the locking lever, prevents the loader from being prematurely elevated while any tape is still out of the cartridge. A plurality of electromechanical sensors on the tape deck is responsive to the loading and locking steps to initiate specific electronic actions relating to the tape drive and the data control functions performed by the system electronics.

23 Claims, 10 Drawing Figures

PATENTED JAN 29 1974 3,788,571

SHEET 1 OF 4

INVENTORS
LESLIE P. FINSTER
RICHARD J. PETKOVSEK
TREVOR D. READER
WARREN W. REYNOLDS
WILLIAM A. SOURS
BY Gottlieb, Rackman & Reisman
Harry M. Weiss
ATTORNEYS

TAPE CARTRIDGE LOADING AND POSITIONING SYSTEM

This invention relates to tape decks and more particularly, to a tape deck system incorporating devices to permit rapid, convenient and secure loading thereon of a tape cartridge and to align the tape cartridge with the tape deck during the loading step.

Current developments in several important industrial areas have marked the increasing need for information recording and dissemination apparatus. Of primary significance in this regard is the new equipment required to prepare, store and present the large quantities of information which must be preserved and to which access is then necessary. Similarly, other fields are also utilizing some of the latest advances in information storage and retrieval, although in somewhat different ways. Two examples of these related fields of activity are in data processing, where information is stored and read out, and in consumer electronics, where various recording media are utilized generally for entertainment purposes.

In both of the foregoing illustrative fields, one of the leading media for the needed recording and playback is magnetic tape. And as fields such as these have developed, so have the techniques for preparing tape for recording, loading it into machines and automating the various steps associated with the use of the tape, such as motor operation, "reading" (or playback) and "writing" (or recording). One desirable and widely accepted improvement in this technology is the use of tape cassettes, which facilitate storage (e.g., when a tape unit is not mounted in a machine) and also the loading of tape into the machine. Cassettes of various designs have been evolved, but there have often been problems of friction and wear with respect to the constant rotation required of the tape reels which actually carry the tape within the cassettes. Such factors detract from the usefulness of tape cassettes.

The use of tape cassettes has not completely eliminated the problem of reliably introducing the initial portion of the tape into the active elements of the machine so that the read and write steps can commence immediately with no need for threading and with no substantial delay. While self-threading devices and closed tape loop arrangements (which eliminate the need for threading per se) have been devised, these solutions have not been completely satisfactory in the context of providing a complete and integrated tape-based system. Thus, careful manual supervision of the loading of cassettes is still often required, and the loading step itself has not been sufficiently routinized to preclude errors. Moreover, once the loading has been accomplished, most systems then overlook the problem of subsequent supervision over the position of the cassette and the attendant importance of retaining the cassette on the tape deck, particularly before all the tape has been rewound. Premature withdrawal of the cassette (e.g., by negligent or careless handling) can cause and indeed has caused critically important data-bearing tape to be either mutilated or destroyed subsequent to correct loading.

Finally, the prior art has also tended to consider the cassette loading problem as a strictly "mechanical" one, involving only the placement of the cassette in a position to supply or receive tape. Once the loading step has been completed, separate electronic controls may be energized (either manually or automatically) to achieve the necessary power and operation steps such as the application of tension to the tape drive, responding to the initial tape advance to give special instructions to control the system, and furnishing additional information to the control unit based on the cassette loading step. The integration of electronic sensing and the mechanical design features can enable the system to be directly responsive to the cassette and its loading, and this has also been largely ignored heretofore.

It is therefore an object of this invention to obviate one or more of the aforesaid difficulties.

It is also an object of this invention to improve the structure of a tape cartridge to enhance the ease of tape movement.

It is another object of this invention to permit loading of a tape cartridge to be more easily accomplished.

It is a further object of this invention to positively prevent the withdrawal of a tape cartridge from a tape deck at a time after recording tape has emerged from the cartridge and prior to the completion of rewind.

It is still another object of this invention to integrate the system electronics with the loading and positioning equipment.

Additional objects and advantages of this invention will become apparent when considered together with a description of one particular illustrative embodiment of the invention in which a tape deck structure is disclosed. The basic construction of the tape deck includes the principal tape advance and associated mechanical equipment on the upper surface of the deck, with the drive mechanism and certain responsive electromechanical equipment on the undersurface of the deck. Any electronic circuitry which may be used to control the tape advance functions and the recording and playback functions may be mounted on printed circuit boards on the undersurface of the tape deck. An overall system with which the tape deck of the present invention can operate is disclosed in copending application Ser. No. 104,931, filed Jan. 8, 1971, and assigned to the assignee of the present application.

The tape deck comprises a supply reel and a take-up reel at opposite ends of the tape deck. Attached to the take-up reel is a permanent tape leader element which is threaded around a friction capstan and a first pair of tape guide posts, past the write and read heads to a second pair of tape guide posts and finally to a leader clasp. When no cartridge has been loaded on the deck, the leader clasp sits in a home slot in a locator and guide block affixed to the upper surface of the tape deck. The leader clasp is adapted to receive the leading edge of the recording tape from the tape cartridge when the cartridge is mounted onto the tape deck — in particular, the clasp comprises two upwardly projecting posts, the first of which is permanently attached to an eyelet of the tape leader element and the second of which is adapted to receive and grip an eyelet attached to the leading edge of the magnetic tape wound on the cartridge supply reel. Thereafter, when any tape movement occurs, the leader clasp will link the leader and the tape and will pull the tape through the tape path towards the take-up reel, and, ultimately, will pull the tape back towards the supply reel during rewind.

Drive motors are associated with each of the supply and take-up drive reels and are adapted to apply equal and opposite pulling forces to the tape even when the system is not actually advancing tape. Thus, when a tape cartridge has been loaded onto the tape deck as will be described below, the motors are energized and apply torque to their respective shafts in opposite directions (i.e., clockwise for one and counterclockwise for the other). Such opposed directions of motor torque are sufficient to apply the necessary tension to the tape, with the resultant friction forces eliminating any problem attributable to imbalance between the two drive motors. The actual tape motion and direction of travel are determined by the motion of a friction capstan, which may be a cylindrical rubber roller mounted on a shaft extending from a capstan motor affixed to the underside of the tape deck. The friction capstan is positioned outwardly of the take-up reel, so that a substantial portion of its outer periphery is in contact with the tape or leader during all phases of operation — this insures positive pulling control for the capstan with respect to the tape.

The supply drive hub has an upper projecting spindle or shaft in which is mounted a spring clip having two opposed arms which project beyond the cylindrical periphery of the shaft. The spring arms are adapted to mate with one of several pairs of corresponding grooves in the internal wall of the supply reel central hole, or aperture. When the cartridge is lowered onto the supply drive shaft, the opposing spring arms are compressed inwardly and are initially held in that compressed position as the supply drive shaft commences its initial rotation (e.g. when tape tension is applied). However, as soon as the driveshaft rotates sufficiently to bring the compressed spring arms into alignment with any pair of opposed grooves in the aperture of the tape supply reel, the arms will spring outwardly into these slots, thus establishing a firm gripping relationship between the drive shaft and the cartridge supply reel. Moreover, the drive shaft, with its contained spring, and the cartridge with its tape supply reel, are so dimensioned that when the spring arms are captured by the grooves in the supply reel aperture, the supply reel is pulled down firmly onto the supply reel hub and thereby forced to assume a free riding position with respect to the cartridge housing. In this orientation, the supply reel makes no external contact with the cartridge housing; the only external contact from the supply reel is with the supply drive shaft and its underlying flange. Positive and free-moving rotation of the cartridge supply reel is thereby assured.

The mounting of the tape cartridge onto the supply drive hub, together with the linking up of the recording tape eyelet and the leader clasp, are facilitated by the use of a loading carriage hinged to the upper surface of the tape deck. The loader is initially positioned substantially vertically for the tape cartridge to be placed in the loader's receiving cavity. This cavity is located at one end of the loader and is adapted to overlie the supply drive hub of the tape deck when the loader is lowered onto the tape deck. The loader and the receiving cavity portion thereof are dimensioned so that the inner aperture of the tape supply reel of the loaded cartridge will mate with the upwardly projecting supply drive shaft when the loader is lowered onto the tape deck. As described above, this mating relationship serves to force the cartridge down onto the supply drive shaft, compressing the spring arms which project from opposite sides of the shaft. Subsequently, after rotation of the drive shaft commences, the compressed spring arms will ultimately expand into one of the pairs of opposed grooves in the interior periphery of the supply reel aperture.

In addition, after the cartridge is placed in the receiving cavity of the loader, and the loader is subsequently lowered onto the tape deck surface during the loading operation, the lead eyelet of the cartridge will be coupled to the forward retaining post of the leader clasp, thus joining the leader and the magnetic tape contained within the cartridge. This coupling is mandated by the position of the cartridge in the loader in conjunction with the position of the leader clasp in the "home" slot in a locator and guide block on the surface of the tape deck. Unless both of these orientations have been correctly assumed (i.e., the cartridge in the receiving chamber of the loader and the leader clasp correctly positioned in the home slot), the tape eyelet will not become coupled to the retaining post of the leader clasp and tape advance cannot commence. However, the system is arranged such that the simple step of placing the tape cartridge in the receiving cavity of the loader, followed by lowering the loader towards the upper surface of the tape deck, will compel the coupling of the tape eyelet to the leader clasp as long as the leader clasp is in its normal rest position in the home slot.

This latter position for the leader clasp is also established by a further mechanical attribute of the invention: a locking lever, which is moved into a locking position with respect to the loader after the loading step has been completed. Prior to the loading, the locking lever is in the unlocked position. When the locking lever is in the unlocked position, a lug attached to the shaft of the locking lever forces the leader clasp into the proper position in the home slot so that the retaining post of the clasp is aligned to receive the eyelet of the magnetic tape in the cartridge when the loader is lowered onto the tape deck. The lug of the locking lever also serves to prevent the displacement of the leader clasp prior to lowering the loader to the tape deck and before the locking lever is moved into the locking position after loading has been completed. Moreover, in order for the loader to be lowered onto the tape deck, the locking lever must be in the unlocked position; accordingly, the lug attached to the shaft of the locking lever must similarly be in the position forcing the leader clasp to be in proper alignment with the tape eyelet of the cartridge. This alignment procedure insures that the correct portion of the leader clasp will be in position to receive the tape eyelet during the loading step.

Upon loading, the initial contact between the cartridge in the loader and the tape deck occurs with respect to the supply drive shaft and the inner periphery of the cartridge supply reel, and also between the eyelet of the tape and the leader clasp. These elements engage upon the lowering of the loader onto the tape deck. Subsequently, a dual locking arrangement is employed to preclude premature elevation of the loader after it has been lowered onto the tape deck to commence operation of the system, and even more significantly, after tape has begun to be removed from the tape cartridge and is moving past the heads and towards the take-up reel. Such improper movement of the loader at any time after the loading step has been completed could result in severe problems such as mutilating the tape, losing data, recording erroneous data and the like.

The first step in the locking procedure is the manual movement of the locking lever to a locked position in which the lever handle itself overlies the loader in the loaded position. This is accomplished by rotating the locking lever approximately 90° from a first clearance position adjacent to a rectangular cutout in the upper surface of the loader, to a second locked position in which the lever is in contact with a stop on the upper surface of the loader, with the lever thereby being in a fixed position precluding vertical movement of the loader.

The second aspect of the locking arrangement involves the commencement of tape movement. It will be recalled that prior to loading, the leader clasp was compelled to be in the home slot position by virtue of the blocking position of the lug attached to the locking lever shaft. By the same movement of the locking lever from its unlocked position to the locking position to keep the loader in place, the lug which has previously blocked the movement of the leader clasp is concurrently rotated out of the blocking position into a clearance position. Accordingly, the leader clasp, now having attached to it the magnetic recording tape from the cartridge by virtue of the attached eyelet, is free to move towards the take-up reel when drive power is applied to the system. When the system commences operation, and the leader clasp begins to proceed on the path towards the take-up reel and tape is being withdrawn from the supply reel of the cartridge, the actual withdrawal of the leader clasp from the home slot causes a locking catch, mounted on the upper surface of the tape deck, to engage a catch lip on the loader and thereby further retain the loader in the loaded position.

This locking catch is normally urged towards the locking position by virtue of a spring arm of a microswitch mounted to the undersurface of the tape deck — the microswitch spring arm's bias is transmitted, by means of a connecting lever, both to the home slot position and to the locking catch. However, when the leader clasp is nearing the end of its travel and moving toward the home position (i.e., during rewind), the lever, which includes a ramp portion, is forced downward against the urging of the microswitch spring arm, thus returning the locking catch to the clearance position. It remains in this position as long as the leader clasp stays in the home slot. As soon as the clasp is withdrawn from the home slot as the tape begins to move in the forward direction towards the take-up reel, the ramp portion of the connecting lever will no longer be restrained in its attempt to move upwardly under the urging of the microswitch spring arm. Accordingly, the ramp will be elevated in response to the removal of the leader clasp from the home position and the locking catch will also be moved into the locked position with respect to the catch lip on the loader itself. This locking arrangement will be maintained as long as the tape is not fully rewound into the cartridge.

In addition, this locking catch feature is essentially independent of the main locking lever, since the accidental movement of the locking lever to the unlocked position, after loading, and starting the tape in a forward direction, will still not permit the loader to be elevated. In order for the loader to be raised, both the locking lever and the locking catch must return to their clearance positions, the former by manual movement of the lever and the latter by full rewinding of the tape into the supply reel of the cartridge. It is only when these two steps have been taken (and no damage can be done to the cartridge or the tape), that the loader can again be elevated and placed in the loading position.

The system of this invention also integrates several electronic functions with the loading, positioning and locking mechanisms described above. Initially, when the cartridge is placed in the receiving cavity of the loader and the loader is lowered onto the tape deck, two related electronic elements are enabled. Both of these elements comprise upwardly spring-biased pins projecting through the surface of the tape deck — the bias for each of these pins is supplied by a microswitch spring arm on which each pin rests, the microswitches being attached to the undersurface of the tape deck. The first such pin normally mates with a clearance hole in the cartridge loader — when no cartridge is present in the loader and the loader is lowered onto the tape deck, the clearance hole will pass over and around the first spring-biased pin, causing no responsive action. However, when a cartridge is present in the loader and the loader is lowered onto the tape deck, the cartridge itself occupies a space immediately above the clearance hole and forces the first spring-biased pin downward against the urging of the spring arm of the microswitch. The activation of this "cartridge-loaded" microswitch informs the system that a cartridge has been loaded into the tape deck.

The cartridge is also equipped with a removable "write enable" pin or plug, which can optionally be inserted in a cavity in the undersurface of the cartridge housing. The purpose of this plug is to control certain of the electronic functions which the system is to be permitted to perform with respect to the tape of that particular cartridge — for example, it may well be that the tape in the cartridge contains important data which must be retained and not erased. If that is the case, the system must be instructed not to write on the tape, and to read only therefrom. On the other hand, if the tape is either blank or contains data which may be read out and then erased, the write function of the system should not be inhibited. The "normal" condition of the cartridge is therefore established to inhibit the writing function unless the control cavity is occupied by the write enable plug. In these normal circumstances, therefore, when the cartridge in the loader is lowered onto the tape deck, the control cavity will accommodate fully the second spring-biased pin with no contact between them. The system electronics is thereby informed that no writing is to be permitted with respect to this particular tape cartridge and that data is only to be read therefrom. On the other hand, when a tape is blank and is to be written on, or contains data which need not be preserved, the write enable plug will be inserted in the control cavity of the cartridge and thus will make contact with the spring-biased pin upon lowering of the loader onto the tape deck. This will depress the pin against the urging of the spring arm of a microswitch, energizing this microswitch and removing the inhibition which had existed with respect to the write function. The system electronics can then operate to perform both write and read functions with respect to the tape contained in that cartridge.

Following the loading in of a tape cartridge, in which the "cartridge-loaded" sensor has been activated, the locking lever is moved into its locking position with respect to the loader. When this position of the locking lever is assumed, a bracket attached to the shaft of the locking lever contacts a spring arm on a third microswitch mounted on the undersurface of the tape deck. The series combination of this switch and the cartridge-loaded switch in the operated states serves to apply tape tension to the system. Specifically, the drive motors for both the supply and take-up reels are thereby energized to apply equal and opposite forces to the tape. However, in the absence of a specific instruction to energize the friction capstan which drives the tape in either the forward or the reverse direction, the tape will not yet commence its movement.

Following the loading step, which activates the two spring-biased pins connected to the sensors attached to the undersurface of the tape deck, and also subsequent to the locking step which causes tape tension to be applied to the system, a fourth electronic sensor is arranged to detect the departure of the leader clasp from the home slot position when tape movement commences. As previously noted, the auxiliary catch arrangement for the loader itself is part of a lever having a ramp-like projection which is normally biased upwardly into the home slot. However, when the leader clasp is in the home slot (prior to any advance), the clasp serves to depress the ramp portion of that lever, which in turn depresses an integral arm of the lever which projects downwardly through the tape deck onto a spring arm of the fourth microswitch. The presence of the leader clasp in the home slot therefore maintains this microswitch in the operated condition until tape movement commences. The electronics of the system is thereby informed that the tape is fully within the cartridge. After forward tape movement has begun, the leader clasp leaves the home slot and begins to move towards the take-up reel. In leaving the home slot, the ramp member then moves upward in response to the urging of the spring arm of the underlying microswitch. The microswitch thereby moves to an unoperated position, advising the system electronics that at least some portion of the recording tape has been withdrawn from the cartridge. With this microswitch in the unoperated condition after the clasp has left the home slot position, reverse drive power (i.e., rewind) can be applied to the tape; if the leader clasp has not left, or returns to, the home slot position, any reverse tape motion will be inhibited, thus precluding damage to either the cartridge or the permanent leader element attached to the leader clasp.

It is therefore a feature of an embodiment of this invention that a tape deck includes an attached loading device to facilitate mounting a tape cartridge accurately on the deck.

It is another feature of an embodiment of this invention that a tape deck includes positioning apparatus to correctly align a tape cartridge, in a loading device, with drive and locking apparatus on a tape deck.

It is a further feature of an embodiment of this invention that dual locking protection is provided against the improper removal of a tape cartridge during the operation of a tape deck system.

It is yet another feature of an embodiment of this invention that a tape cartridge is constructed with an inner supply reel adapted to ride freely within the cartridge housing in accordance with the mounting geometry of the tape deck.

It is also a feature of an embodiment of this invention that retaining means on the supply reel drive spindle establishes free rotational orientation of the supply reel following the mounting thereon of the tape cartridge.

It is still another feature of an embodiment of this invention that electromechanical sensors mounted on a tape deck are responsive to the loading thereon of a tape cartridge to control a plurality of electronic functions.

Additional objects, features and advantages of the present invention will become apparent when taken in conjunction with a presently preferred, but nonetheless illustrative, embodiment of the invention as explained in the following detailed description and as shown in the accompanying drawing, wherein.

Figure 10:
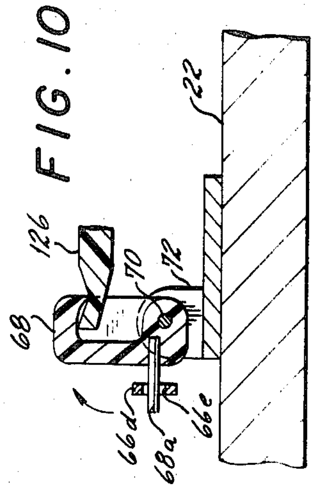
Figure 8:
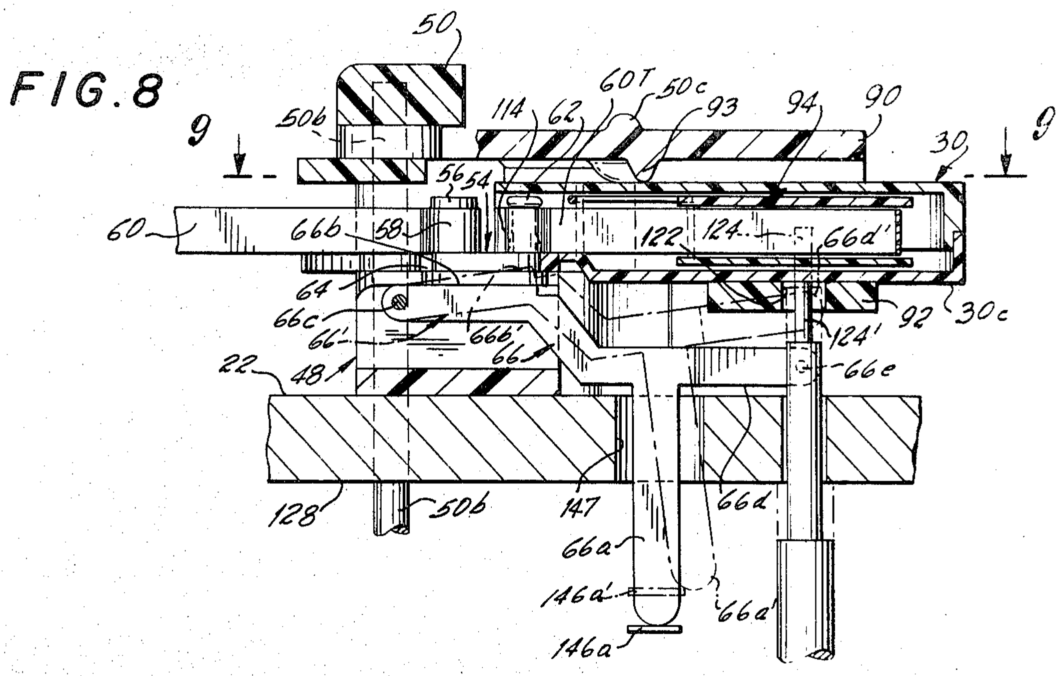
FIG. 8 is an enlarged fragmentary sectional view of the locking and positioning apparatus, including the locking lever, the leader clasp and two of the electromechanical sensor arrangements, all taken along the line 8—8 of FIG. 3 in the direction of the arrows.
Figure 9:
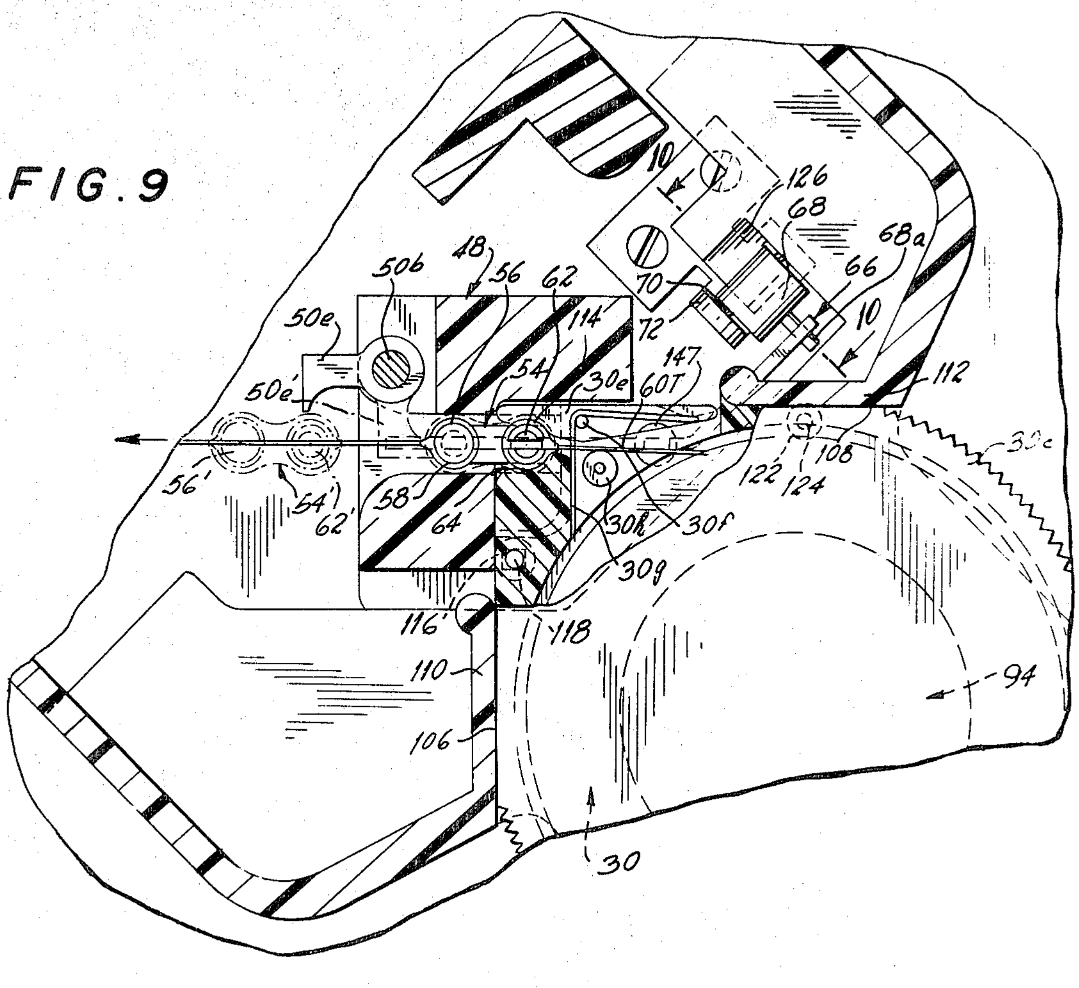

FIG. 9 is an enlarged fragmentary sectional view of the cartridge locating and locking apparatus, illustrating two positions of the tape leader clasp and the locking lever lug, taken along the line 9—9 of FIG. 8 in the direction of the arrows; and FIG. 10 is a fragmentary sectional view of a catch retaining the loader in the loaded position, taken along the line 10—10 of FIG. 9 in the direction of the arrows.

I. THE TAPE DECK ELEMENTS

A. The Locator and Tape Guide Blocks; the Leader Clasp

Figure 1:
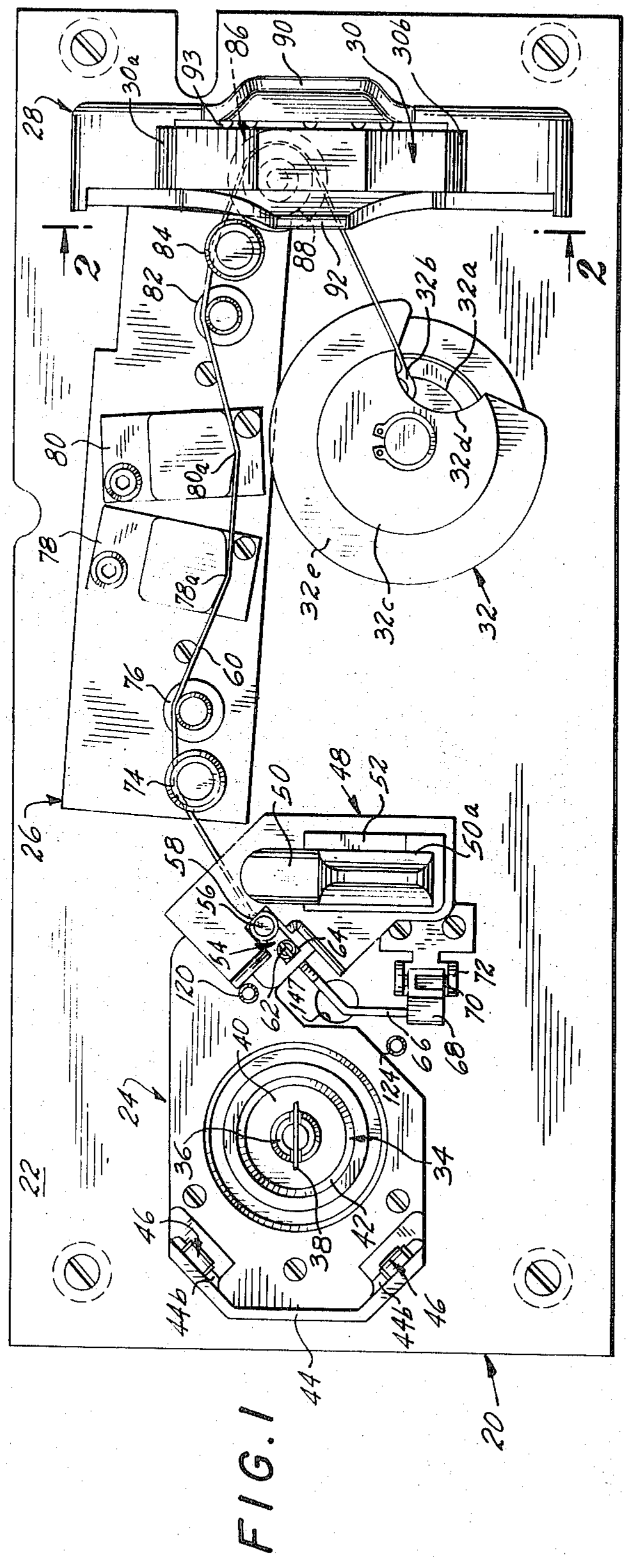
FIG. 1 is a plan view of a tape deck system incorporating the present invention, illustrating a tape cartridge loader in the vertical or unloaded position.

The basic construction of the tape deck, including the mechanical and electrical apparatus attached to both the upper and lower surfaces thereof, can be described with respect to several of the figures of the drawing. Initially, FIG. 1 illustrates a tape deck 20 from a plan view in which the upper surface 22 is shown with no cartridge loaded onto the tape deck. Broadly, the elements appearing in FIG. 1 include a positioning or locating block 24, a tape guide and head mounting element 26, a cartridge loader 28, the cartridge 30 (seen in end view) and the take-up reel 32. Positioned within the locator block 24 at the left of FIG. 1 is the supply hub structure 34, which includes drive shaft 36 to which is attached spring clip 38 shown in the normal uncompressed form in FIG. 1. Drive hub structure 34 also includes main supporting flange 40 having an outer circumferential lip or ridge 42 which is raised somewhat from the level of flange 40. Also associated with positioning block 24 is wall 44, which prevents backward insertion of cartridge 30, and a pair of cartridge retaining clips 46 at opposite corners of block 24.

Tape guide block 48 is situated adjacent to positioning block 24. Locking lever 50, mounted on block 48, is illustrated in the unlocked position, with its right edge 50*a* in contact with a rest stop 52 projecting upward from the block 48. Tape leader clasp 54 includes a first post 56 projecting upward from the clasp to which eyelet 58 of a permanent leader element 60 (e.g., constructed of clear mylar) is attached. The other portion of leader clasp 54 is split post 62, to which an eyelet permanently affixed to the lead end of the magnetic recording tape in cartridge 30 will be attached during the loading step. In FIG. 1, leader clasp 54 is shown positioned in its home slot 64, causing underlying lever 66 (e.g., see FIG. 9) to remain in a depressed condition, and causing catch 68 to be in an open receiving condition for the subsequent loading step. (Catch 68 is pivotable around pin 70 between the upwardly projecting arms of bracket 72, and will ultimately capture a catch lip on loader 28 after loading is completed and tape advance has commenced).

B. Tape Guide Posts and Heads

The path of the permanent tape leader element 60 between leader clasp 54 and take-up reel 32 passes across tape guide post and head block 26. In traversing this tape travel path, a first pair of tape guide posts 74, 76 is reached, with the leader 60 (and subsequently the recording tape 60T itself) passing behind the guide posts and then coming in contact with write head 78 followed by read head 80. The sensitive portions of the write and read heads are found at the apexes 78*a* and 80*a* of the heads respectively, and these heads are generally conventional. operating to detect electrically the magnetic signals written on the tape (the read head) and to apply electrically additional magnetic signals to the tape thereby erasing any existing signals when so instructed by the system electronics (the write head). Beyond the heads is located a second pair of stationary guide posts 82, 84, behind which the leader 60 (and subsequently the leader clasp 54 and the recording tape 60T) passes, next reaching the friction capstan 86 shown hidden in FIG. 1. The principal portion of the friction capstan around which the leader element 60 and subsequently the tape itself passes, is a cylindrical rubber roller 88 which serves to apply the frictional drive forces (either forward or reverse) to the tape to control its actual movement.

C. The Take-Up Reel Assembly

The take-up reel 32 includes an inner hub 32*a* to which the permanent leader element 60 is attached by means of eyelet 32*b*. The inner hub 32*a* is concentric with outer hub 32*c*. Upon the initial application of forward driving power to the system, inner hub 32*a* is energized to rotate counterclockwise. drawing leader 60 around its outer periphery (shown only in part in FIG. 1); at this time, outer hub 32*c* does not rotate since no separate drive power is applied to it. Leader 60 is, accordingly, wound up on inner hub 32*a*. When sufficient rotation has occurred such that leader clasp 54, coupling leader 60 and recording tape 60T, arrives at take-up reel 32, leader clasp 54 is lodged within the aperture created by cutout 32*d*. Thereafter, inner hub 32*a* can no longer rotate independently of the outer hub 32*c*, and the two hubs are arranged to rotate together. Accordingly, the recording tape, bearing the data or which is to receive data during a write cycle, will be wound uniformly on outer hub 32*c*.

During the rewind step, the inner and outer hubs 32*a* and 32*c* respectively are coupled together for coincident rotation until all the recording tape has been unwound from outer hub 32*c*. At that point, leader clasp 54 again becomes the leading element of the tape (in reverse) and as it is withdrawn from the aperture created by cutout 32*d*, outer hub 32*c* ceases to rotate and leader tape 60 begins to emerge from its storage position on the outer periphery of inner hub 32*a*. This arrangement avoids the unusually large take-up reels formerly required by the prior art when a leader hood or clasp arrangement was being utilized, and also avoids distortion of the recording tape by recessing the leader clasp within the aperture created by the cutout 32*d*. Finally, the present arrangement obviates the need for using a predetermined length of leader tape, since inner hub 32*a* will accommodate any length of leader element 60 and will begin rotating outer hub 32*c* whenever leader clasp 54 has become lodged in the aperture created by cutout 32*d*.

D. The Loader Carriage and the Cartridge

Figure 2:
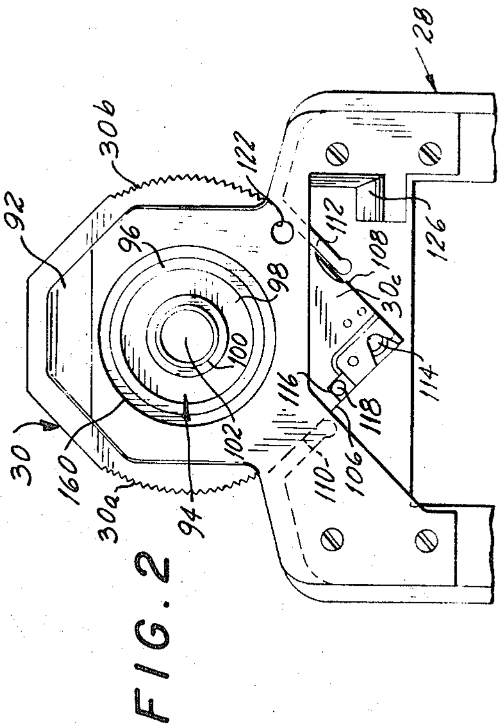
FIG. 2 is a fragmentary view of a tape cartridge and the upper portion of the loading mechanism, taken from the perspective of line 2—2 of FIG. 1 in the direction of the arrows.
Figures 3, 4, 5:
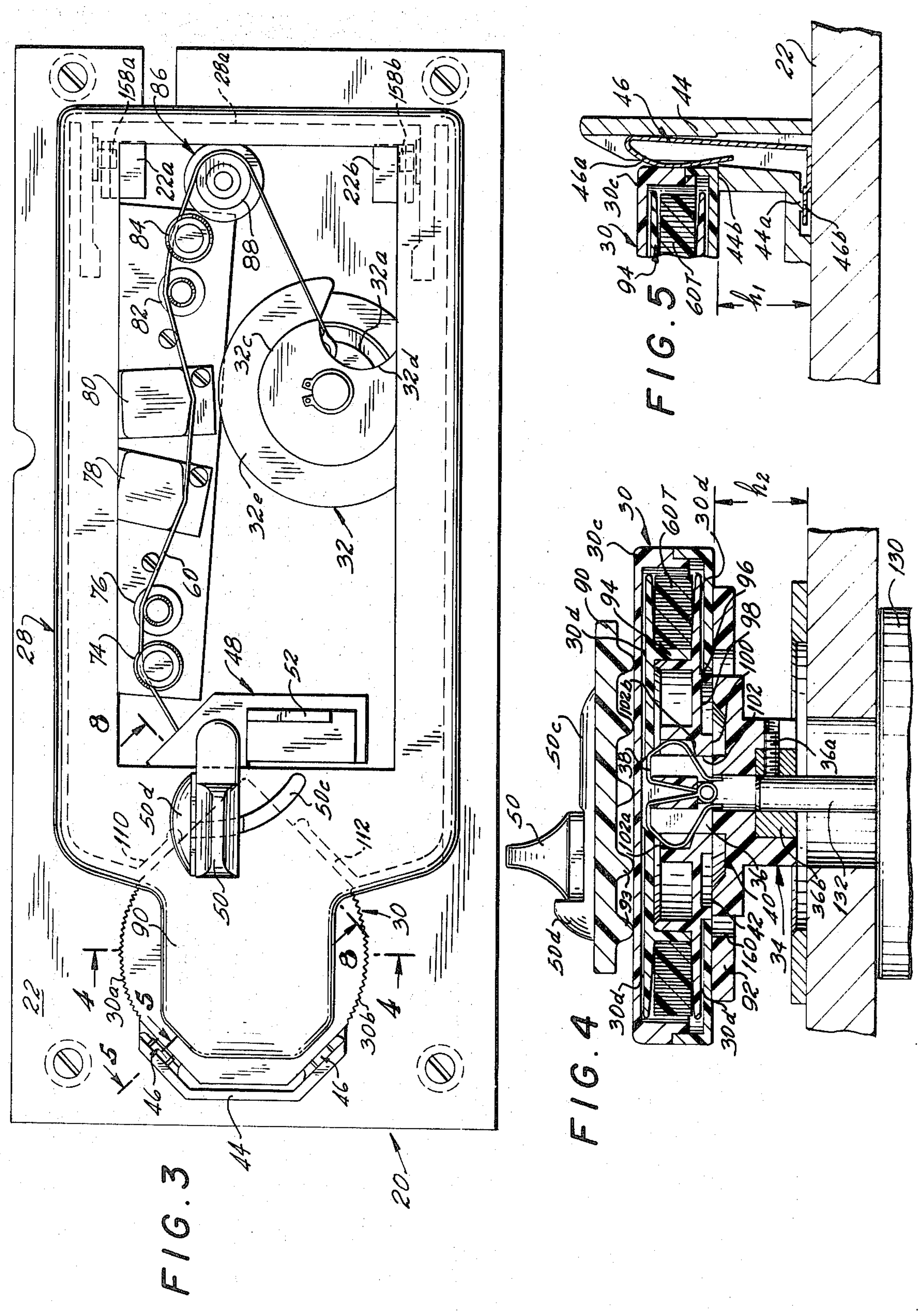
FIG. 3 is a plan view of a tape deck in accordance with the present invention, illustrating the tape cartridge loading mechanism in the loaded position with the loader locked in place.
FIG. 4 is a sectional view of the locking lever, cartridge loader, the cartridge and a fragmentary portion of the tape deck including the drive spindle, taken along the line 4—4 of FIG. 3 in the direction of the arrows.
FIG. 5 is a fragmentary sectional view of the cartridge retaining structure mounted on the tape deck, taken along the line 5—5 of FIG. 3 in the direction of the arrows.

The loader 28 is only apparent in end view in FIG. 1, and is seen to include a first upper projecting tongue 90 and a lower supporting tongue 92. Cartridge 30 is deposited between tongues 90 and 92, and the upper portion of the housing of cartridge 30 rests lightly against the guide ramps 93 on the underside of upper tongue 90. With loader 28 in the position shown in FIG. 1, cartridge 30 is simply deposited into the cavity formed between tongues 90 and 92, with its downward travel (into the paper in FIG. 1)being limited by contact between the straight side surfaces of cartridge 30 and the support arms of loader 28. The loading and handling of cartridge 30 is facilitated by the presence of opposed serrated edges 30*a* and 30*b*. Referring to FIG. 2, the position of cartridge 30 when loaded into loader 28 is illustrated from the perspective of line 2—2 of FIG. 1. Referring to FIGS. 2 and 4, cartridge 30 includes a self-contained supply reel 94 having an outer flange 96, a reduced central flat surface 98 and an interior flange 100 defining main aperture 102 which is adapted to accommodate drive shaft 35 when cartridge 30 is mounted on to the tape deck drive hub 34 during the loading step as will be described below. Supply reel 94, as will also be seen below, will ride freely from its surrounding cartridge housing 30c after mounting is completed.

When cartridge 30 is loaded into loader 28, straight surfaces 106, 108 of cartridge 30 come into contact with downwardly slanted loader support arms 110, 112 respectively, thus defining the receiving chamber or cavity within loader 28 for cartridge 30. In the loaded position as illustrated in FIG. 2, tape eyelet 114 is visible in the lower square corner of cartridge 30. By the geometry of the system of the invention, eyelet 114 is adapted to overlie split post 62 of leader clasp 54 during the loading step, such that the recording tape 60T contained within cartridge 30 (and wound on supply reel 94) will be attached to leader 60 when post 62 is inserted into eyelet 114.

E. The Loading-Responsive Sensors

Cartridge 30 further includes a cavity 116 which contains, as illustrated in FIG. 2, a "write enable" plug 118. The insertion of plug 118 in control cavity 116 characterizes the tape of cartridge 30 and indicates to the system electronics that the writing function should not be inhibited with respect to this tape. Should it be desired to preserve whatever data exists on the recording tape in cartridge 30, plug 118 would be omitted (or inserted into the opposite end of cavity 116 for storage), and the corresponding electromechanical sensor on the surface of deck 22 would not be energized during loading. This would act as an indication that the data on this tape should not be erased. In particular, referring to FIGS. 1 and 2, the presence of write enable plug 118 in control cavity 116 will cause spring-biased sensor 120 to be depressed when loader 28 is lowered towards tape deck surface 22; if enable plug 118 is absent from the underside of cartridge 30 when such loading takes place, sensor 120 will remain stationary.

Similarly, loader 28 is equipped with clearance aperture 122, adapted to mate over sensor 124 on the upper surface 22 of tape deck 20. As can be seen in FIG. 2, the inserted cartridge 30 in loader 28 occupies the space between tongues 90, 92 immediately behind clearance aperture 122. Accordingly, when loader 28 is lowered towards tape deck 22, upwardly projecting electromechanical sensor 124 will be depressed, thus informing the system that a cartridge has been loaded onto the tape deck. In the absence of a loaded cartridge the lowering of loader 28 towards tape deck 22 will furnish no responsive result, since aperture 122 will clear sensor 124, thus leaving sensor 124 in its normal position.

F. Auxiliary Locking Feature

Loader 28 is also equipped with catch lip 126, as shown in FIGS. 2, 9 and 10, which is designed to mate with catch 68 on tape deck surface 22. During the loading step, lip 126 passes freely downward past the hooked portion of catch 68 (e.g., see FIG. 10); however, when leader clasp 54 leaves home slot position 64, catch 68 springs into position to retain loader 28 in its lowered position. This is an auxiliary locking feature of the invention which, together with the action of locking lever 50, serves to prevent raising of loader 28 when tape 60T is threaded through the tape path or when leader clasp 54 is not fully within home slot 64.

G. The Drive Motors

Figure 6:
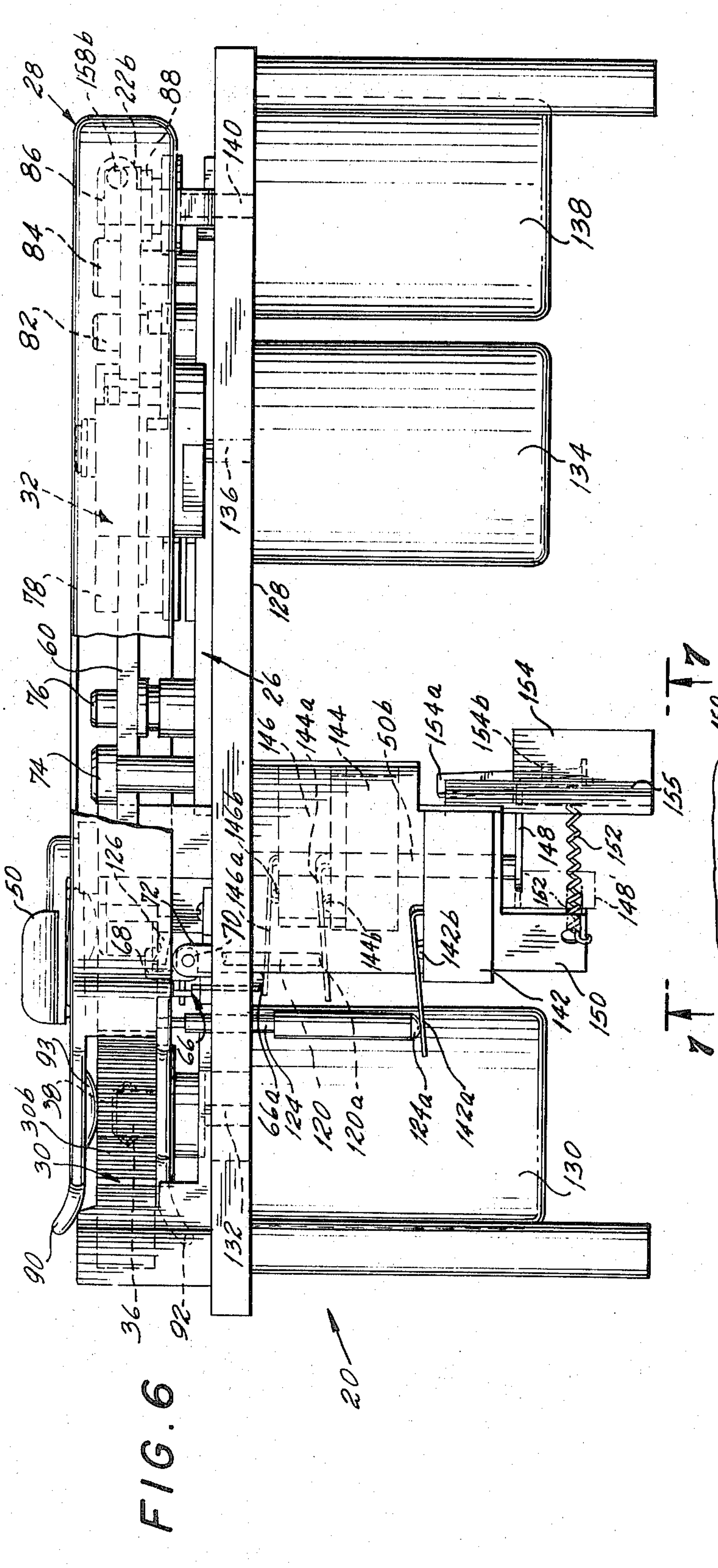
FIG. 6 is a front view of the tape deck in accordance with this invention, with the loader in the loaded position, and showing the upper and lower surfaces of the tape deck and some of the apparatus attached thereto, including multiple electromechanical sensors attached to the undersurface of the tape deck and a plurality of drive motors.

In FIG. 6, showing loader 28 in its lowered loaded position (see also the plan view of FIG. 3), the undersurface 128 of tape deck 20 is also seen to have mounted thereon several of the electrical and electromechanical elements which control the supplying of power to the tape deck system. Drive motor 130 has its drive shaft 132 connected to supply reel drive shaft 36. Towards the other side of tape deck 20, take-up reel 32, shown in phantom in FIG. 6, is powered by a similar drive motor 134, which is connected to take-up assembly 32 by means of drive shaft 136. The third drive motor mounted on the undersurface 128 of tape deck 20 is motor 138, which has its shaft 140 connected to friction capstan 86. As previously noted, friction capstan 86 includes a cylindrical rubber drive wheel 88 around which tape leader 60 is initially wound. Leader 60 occupies the same relationship with respect to the various guide posts, heads and the friction capstan as does the recording tape 60T itself when the latter is threaded through the tape path. Capstan wheel 88 serves to supply the main directional driving force to the tape subsequent to the application of tape tension to the system by energizing motors 130 and 134 equally inopposite directions.

H. The Electromechanical Responses of the System

In addition to the tape tension and drive motors 130, 134 and 138 described above, the undersurface 128 of tape deck 20 has mounted thereon the critical electromechanical sensors which respond to various actions occuring on the upper surface of the tape deck to initiate specific electronic responses. The electronic operation of a system which can be utilized to control the subject tape deck as described herein, is disclosed in copending application Ser. No. 104,931, filed Jan. 8, 1971,and assigned to the assignee of the present application. All references herein to the system electronics will be understood by those skilled in the art; a preferred system is disclosed in the aforesaid copending application.

I. The Responses to the Loading Step

Initially, it has already been noted that the presence or absence of a cartridge within loader 28 is detected by contact between such a cartridge and spring-biased pin 124, which projects upward over the top of tape deck surface 22 — when loader 28 containing a cartridge 30 is lowered to the tape deck surface, the cartridge housing forces such pin 124 downward, activating a switch attached to undersurface 128.

Figure 7:
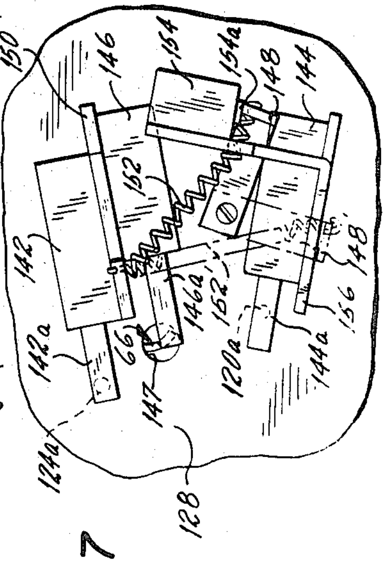
FIG. 7 is a fragmentary bottom view of the underside of a portion of the tape deck, illustrating the electromechanical sensors, as viewed along the line 7—7 of FIG. 6 in the direction of the arrows.

As seen in FIGS. 6 and 7, pin 124 is in its depressed position, being held in that position by the presence of cartridge 30 in loader 28 in the loaded position. This position of pin 24 is achieved when loader 28 is lowered towards upper surface 22 of tape deck 20. In so doing, contact is made between the upper surface of pin 124 and the lower surface of housing 30*c* of cartridge 30 (see initial and subsequent positions 124 and 124' in FIG. 8). As pin 124 is gradually depressed by the lowering of loader 28, contact tip 124*a* of pin 124 forces spring arm 142*a* of microswitch 142 downward, causing switch contact 142*b* to be depressed and energizing microswitch 142. Although this particular energization may be the first to occur as loader 28 is lowered onto surface 22 of tape deck 20, no responsive electronic action occurs immediately; however, a circuit is prepared for ultimate energization based upon the subsequent movement of locking lever 50 into its locking position, which will result later in the application of tape tension to the system.

The second sensor is pin 120, which will be depressed when a cartridge containing a write enable plug 118 is contained in the write enable plug control cavity 116

(FIG. 2). If such a write enable plug is in the control cavity, this is interpreted as an indication that the electronic writing function can be enabled and that the data, if any, on the tape in cartridge 30, need not be preserved following readout (if no such plug were inserted, pin 120 would not be depressed). Assuming that write enable plug 118 is in position in control cavity 116, the lowering of loader 28 containing cartridge 30 toward upper surface 22 of tape deck 20 will cause pin 120 to be depressed, and its lower contact tip 120*a* will accordingly depress spring arm 144*a* of microswitch 144. The depressing of arm 144*a* also depresses spring-biased contact 144*b*, leading to the energization of microswitch 144. This allows the electronics of the system of enable the writing function while cartridge 30 is in place and the system is operating.

2. The Initial Locking Step a. Mechanical Locking and Clearance Functions

When leader clasp 54 is in its home slot position 64, as seen for example in FIG. 9, locking lever 50 is in the unlocked position as shown in FIG. 1; due to the position of shaft 50*b* of lever 50, lug 50*e* coupled thereto will be in the position illustrated in phantom at 50*e*' in FIG. 9. Thus, the tip of lug 50*e* will be in contact with the left edge of leader clasp 54, thus maintaining leader clasp 54 in its home slot position 64. However, after loader 28 is lowered onto tape deck surface 22, with recording tape eyelet 114 having been lowered onto leader clasp retaining post 62, locking lever 50 will be moved to the position illustrated in FIG. 3, representing the loaded position of the system. Locking lever 50 can be readily moved manually along ramp element 50*c*, coming to rest in a depression therein (FIG. 4) and against raised stop 50*d* on the upper surface of loader 28. When this locked position is reached, loader 28 will be restricted against any upward movement by the overlying presence of lever 50, as illustrated in FIGS. 3 and 4. As lever 50 is rotated through the 90° from the unlocked to the locked positions, lug 50e concurrently moves through the same 90° angle from the phantom position 50*e*' illustrated in FIG. 9 to the full line position 50 *e*, thereby clearing the tape advance path for leader clasp 54.

b. Electronic Switching Response

An additional responsive electronic function is served by the movement of locking lever 50 from the unlocked position illustrated in FIG. 1 to the locked position illustrated in FIG. 3. Thus, it will be recalled that as loader 28 was lowered towards the upper surface 22 of tape deck 20, the presence of a cartridge 30 within loader 28 caused the downward movement of pin 124, thus energizing "cartridge-loaded" microswitch 142 when its spring arm 142*a* was depressed after having been contacted by the lower tip 124*a* of pin 124 (FIG. 6). However, no specific electronic result took place at that time. Subsequently, when locking lever 50 is moved into the locked position shown in plan view in FIG. 3, and also being represented by the showings of FIGS. 6–8, an additional switch is energized, which, together with the prior activation of microswitch 142, will result in the application of tape tension to the system.

Specifically referring to FIGS. 6 and 7, shaft 506, coupled to locking lever 50, controls the angular movement of right angle arm 148, which is screw-mounted to shaft 50b. The position of arm 148 and its associated elements illustrated in phantom in FIGS. 6 an 7, is based on locking lever 50 being in the unlocked position, such as is shown in FIG. 1 (FIG. 6 indicates the upper handle portion of locking lever 50 in the locked position, however). In the unlocked position of lever 50, arm 148 is in the phantom position at 148', in contact with the right edge of cutout plate 150. Spring 152, at unlocked position 152' (FIG. 7), is attached at one end to plate 150, and at the other end is coupled to the vertical part of arm 148. As locking lever 50 is rotated 90° clockwise from the position illustrated in FIG. 1, arm 148 (at position 148') is thereby moved 90° counterclockwise against the slight bias furnished by spring 152 to the full line position at 148 in FIG. 7, coming to rest against the vertical edge of mounting plate 155. During this travel, the tension of spring 152 will be overcome, thus permitting arm 148 to remain in the solid line position indicated in FIGS. 6 an 7. In moving towards this rest position, arm 148 is brought into contact with spring arm 154 *a* of vertically mounted microswitch 154. As arm 148 continues to move towards its rest position in contact with plate 155, arm 154*a* is depressed and spring contact 154b of microswitch 154 is activated, thus operating this microswitch.

Together with the prior energization of "cartridge-loaded" microswitch 142 in response to the depressing of pin 124, the sequential operation of microswitches 142 and 154 causes the tape to be placed in tension. Each of reel motors 130 and 134 is turned on, the former being connected to supply drive shaft 36 and the latter to take-up assembly 32. In the absence of tape motion, the motors 130 and 134 are biased equally in opposite directions by appropriate electronic means (not shwon). The leader element 60, connected to permanent take-up eyelet 32*b* on take-up reel assembly 32, is then placed into tension as is coupled recording tape element 60T (FIG. 8) which, prior to tape motion, is still stored within cartridge 30. Nevertheless, by applying clockwise torque to supply assembly 34 and an equal counterclockwise torque to take-up assembly 32, tape 60T (see FIG. 4) and leader 60, coupled through leader clasp 54, are tensioned throughout the path of travel from supply cartridge 30 to take-up reel 32. Ultimately, when friction capstan motor 138 is energized, and driving power is transmitted to capstan 86 by means of motor shaft 140, either motor 130 (for rewind) or motor 134 (for forward tape advance) will also be supplied with increased voltage; however, the normal bias supplied to the other motor will not be removed, thus insuring proper tape tension. If locking lever 50 is, at any time during system operation, returned to the unlocked position, microswitch 154 will open, removing power from drive motors 130 and 134.

3. The Responses to Commencement of Tape Advance

After locking lever 50 has been placed in the locked position illustrated in FIGS. 3 and 6 (and see description above), and tape movement has commenced, leader clasp 54 will leave its home slot position 64, an important step of which the system electronics must be advised. The significance of this step is that it gives an immediate indication that some length of recording tape 60T (FIGS. 8,9) has been removed from cassette 30, and it further indicates to the system that the rewind control should be permitted to operate, if desired. Moreover, it is of critical importance that the loader 28 now be positively gripped in place once tape has commenced to be withdrawn from cartridge 30, in order to avoid inadvertent lifting of loader 28 while the tape is moving through the system. Accordingly, for all these electrical and mechanical reasons, the departure of leader clasp 54 from home slot 64 results in specific electronic and mechanical outputs.

a. The Electrical Control by Lever 66

Considering the views of FIGS. 1, 6 and 8 for the electronic result, a multi-purpose, irregularly shaped lever switches from a normal depressed condition at 66 when leader clasp 54 is in the home slot 64, to a slightly elevated position at 66' when the leader clasp is withdrawn from the home slot. Referring to FIG. 8, the normal position of lever 66 is shown in solid line, with an upward spring-biasing force being supplied by spring arm **146*a* microswitch 146 (see FIG. 6). However, lever 66 remains in the solid line orientation as illustrated in FIG. 8 as long as leader clasp 54 is in home slot 64 — this is attributable to the inability of upper ramp edge 66*b* of lever 66 to move upward because it is in contact with the undersurface of the base of leader clasp 54. As seen in FIG. 6, the normally depressed position of lever 66 causes its downwardly projecting arm 66*a* to maintain spring arm 146*a* of microswitch 146 in the lowered condition, thereby depressing spring contact element 146*b*. At such time, therefore, the system electronics is informed that no tape has been withdrawn from cartridge 30** — i.e., that the tape is fully rewound.

When leader clasp 54 does move from its home slot 64 as tape advance commences (e.g., see phantom showing of clasp at 54' in FIG. 9), the view of FIG. 8 indicates that lever 66 rotates slightly in a counterclockwise direction about pin **66*c* which is fixedly mounted to locator block 24. This rotation, under the upward spring urging of arm 146*a* of microswitch 146, is now permissible since the lower surface of leader clasp 54 no longer obstructs the upward movement of upper ramp edge 66*b* of lever 66. Accordingly, upper edge 66*b* assumes the position shown in phantom at 66*b*' in FIG. 8, with the position of downwardly projecting arm 66*a* moving to 66*a*' concurrently. This upward movement of arm 66*a* causes spring arm 146*a* to move upward to the phantom position at 146*a*', thus permitting spring contact 146*b* to spring upwards and moving microswitch 146 to its unoperated condition. This results in the generation of a signal to the system electronics indicating that the recording tape is not fully rewound; reverse tape motion will therefore no longer be inhibited. As soon as leader clasp 54 returns to its home slot 64, thereby returning microswitch 146 to its normal operated condition (with arm 146a at the full line position in FIG. 8**), rewind has been completed and that function will thereafter be inhibited.

b. The Mechanical Control by Lever 66

The system also responds mechanically to the departure of leader clasp 54 from home slot 64, to lock loader 28 in the lowered loaded position, thereby preventing destruction of the recording tape during operation of the system. This is an obvious prerequisite to preserving existing or new data on the tape and to avoid mutilation of the tape element itself, and serves an auxiliary locking function in addition to that of lever 50. When loader 28 is lowered from its elevated position shown in FIG. 1 towards the upper surface 22 of tape deck 20, catch lip 126 (FIGS. 6 and 10) clears the upper hook of catch 68 and reaches the position illustrated in phantom in FIG. 6. After loader 28 has been locked into position by the initial action of locking lever 50 as described above, leader clasp 54 can depart from its home position, this latter departure causing the second auxiliary locking feature of the invention to become effective.

Assuming tape movement then commences, leader clasp 54 moves from its position indicated at the right in FIG. 9, to the phantom position at 54' to the left in FIG. 9. As has been noted previously, this causes lever 66 to move from its full line to its phantomposition at 66' in FIG. 8. The mechanical response to this movement is controlled by right hand arm **66*d* of lever 66, which thereby moves from the full line position shown at 66*d* in FIG. 8, to the phantom position shown at 66*d*' in that drawing figure. Normally, pin 68*a*, projecting rearwardly from catch 68, rides within aperture 66*e* of right arm 66*d* of lever 66. When lever 66 is in the full line position illustrated in FIG. 8 (based upon leader clasp 54 being in the home slot position 64), catch 68 is at the clearance position illustrated in the plan view of FIG. 1; in this position, catch 68 is prevented from rotating about pin 70 in support bracket 72 by the limiting effect attributable to the contact between pin 68*a* and the upper inside edge of aperture 66*e* in arm 66*d***.

However, when the leader clasp 54 is withdrawn from the home slot 64 at the commencement of tape movement, lever 66 assumes the phantom position at 66' in FIG. 8, thereby causing right **66*d* to assume the phantom position at 66*d*' in FIG. 8, and giving rotational force to catch 68 in the direction indicated by the arrow in FIG. 10. This rotation, caused by contact between the lower inside edge of aperture 66*e* and the under surface of pin 68*a* riding within that aperture, causes catch 68 to come in contact with the upper surface of catch lip 126 of loader 28. The locking position illustrated in phantom in FIG. 6, and in the solid line enlarged view of FIG. 10, is thereby assumed. As long as leader clasp 54 is still out of its home slot position 64, any attempted upward movement of loader 28 will be restricted immediately by contact between catch lip 126 and catch element 68.**

This locking action serves an important backup purpose, since there is the possibility that locking lever 50 will inadvertently be returned to its rest position (illustrated in FIG. 1) before all the tape has been rewound into cartridge 30. If this occurs, lifting of loader 28 at this time would mutilate the tape. However, placing locking lever 50 in its unlocked position is not sufficient to permit loader 28 to be lifted — regardless of the position of locking lever 50 and its coupled lug **50*e* (FIG. 9), catch 68 will continue to retain loader 28 in its loaded position by contact with lip 126 as illustrated in FIG. 10. Unless and until leader clasp 54 returns to home slot position 64, thereby causing catch 68 to rotate opposite to the direction indicated by the arrow in FIG. 10 and thereby release catch lip 126; loader 28** will remain locked in the loaded position.

J. The Free Rotation of the Tape Supply Reel

1. The Cartridge Design

The design of cartridge 30 is also arranged to provide significant advantages to the system of this invention. As previously noted, the shape of cartridge 30 is arranged to mate with the upper section of loader 28, as best illustrated in FIG. 2. Moreover, the external and internal designs of cartridge 30, when mounted on supply drive structure 34 (FIG. 1), serve to furnish the full equivalent of a genuine reel-to-reel system. This is unusual when cassettes or cartridges are utilized, and represents a highly desirable feature of the present invention.

The relationship between the construction of cartridge 30 and the freely rotatable mounting position achieved when cartridge 30 is in position on drive structure 34, is best appreciated by a consideration of FIGS. 1, 2 and 4. Supply reel 94 of cartridge 30 has access to drive structure 34 on upper tape deck surface 22 by means of circular aperture 160 in bottom tongue 92 of loader 28 (FIG. 2). Further referring to FIG. 2, supply reel 94, has, as its bottom surface, an outer flange 96, an annular surface area 98 elevated from flange 96, and an internal flange 100 having the same relative height from surface 98 as does flange 96. The presence of internal flange 100 defines central aperture 102, through which drive shaft 36 of supply drive structure 34 will be inserted.

2. The Loading of the Cartridge

When the loading step is initiated by lowering loader 28 down towards upper surface 22 of tape deck 20, it can be appreciated from a consideration of FIGS. 1, 2 and 4 that initially, the lower portion of supply reel aperture 102 surrounds the upper tip of drive shaft 36 of drive structure 34 (FIG. 1). As aperture 102 continues its downward motion over and around drive shaft 36, the oppositely disposed projecting arms of spring clip 38 are compressed inwardly so that the dimension between the outermost projections thereof is equivalent to the diameter of drive shaft 36. This permits cartridge 30, with internal aperture 102 of supply reel 94, to continue its downward mounting motion during loading. Ultimately, mounting is concluded as will be discussed below when cartridge housing 30*c* comes to rest on corner support shoulders 44*b*, FIG. 5.

The geometry of drive structure 34, and particularly of central drive shaft 36 with projecting spring clip 38, and the complementing geometry of supply reel 94 and particularly of central aperture 102 and surrounding lower flange 96, are such that at the conclusion of loading, and after tension has been applied to the tape, supply reel 94, having recording tape 60T wound thereon, is not in contact with the surrounding housing 30c of cartridge 30. The only contact being made by supply reel 94 is with elements applying rotational forces to it from drive motor 130 via shaft 132. None of the usual friction-producing forces, which tend to impede supply reels in cassette or cartridge systems is present, and whether supply reel 94 is feeding tape to the system in the forward direction or having the tape returned to it during rewind, reel 94 is positioned in essentially a free rotational orientation with respect to surrounding housing 30*c* of cartridge 30. Accordingly, supply reel 94 together with take-up reel 32 forms a true reel-to-reel system with no irregularities in motion based upon the presence of the cartridge housing itself.

3. The supply Reel and Drive Shaft Mounting Relationship

To achieve this free rotational position during mounting, it can be appreciated that as central aperture 102 of supply reel 94 is lowered over supply drive shaft 36, there is initially a clearance between the aperture 102 and the shaft 36. After a very short downward excursion, however, the bottom of aperture 102 will come into contact with the upper projecting portions of spring clip 38. This initial contact will force reel 94 upward with respect to surrounding cartridge housing 30*c*. Thus, even as cartridge 30 is mounted on shaft 36, reel 94 is lifted within cartridge 30 so that it is clear of surrounding housing 30*c*. The downward mounting continues, with spring clip 38 compressed within the confines of the diameter of shaft 36 (substantially equivalent to the inside diameter of aperture 102), until the lowermost mounting point is reached, with outer flange 96 of supply reel 94 in contact with surrounding ridge 42 of the drive hub 34.

The interior surface of aperture 102 of supply reel 94 contains one or more pairs of oppositely disposed grooves such as 102*a* and 102*b* — each groove is 180° away from the other groove of any pair and the two grooves are adapted to receive the opposed arms of spring clip 38 therein, either upon the mounting of cartridge 30 onto drive shaft 36, or upon the initiation of rotation of drive shaft 36 in response to the driving action supplied by shaft 132 of motor 130 (the driving action from shaft 132 is transferred to shaft 36 by means of threaded member 36*a* and metal insert 36*b*, which bears against shaft 132 and which are mounted in the main body of drive hub 34). This arrangement insures that there will be direct driving from motor 130 to supply drive structure 34. Generally, during mounting, cartridge 30 will be lodged over drive shaft 36 such that the opposed arms of spring clip 38 are not aligned with any pair of grooves 102*a*, 102*b*. Thus, when shaft 36 begins to rotate at the commencement of tape advance (or in response to the application of tape tension to the system as described above), a firm gripping action between shaft 36 and supply reel 94 will not be established until shaft 94 rotates to a point where the opposed arms of spring clip 38 can expand into receiving grooves 102*a*, 102*b*. If one pair of such grooves is utilized on the interior surface of aperture 102, shaft 36 needs to rotate a maximum of slightly less than 180° to insure the expansion of the opposed arms of spring clip 38 into grooves 102*a*, 102*b*. If, for example, three pairs of such opposed grooves are utilized (thus placing one groove every 60° around the internal circumference of aperture 102), then the maximum rotation of shaft 36 necessary before the expansion of the arms of clip 38 will be slightly less than 60°. In any event, whether upon mounting itself or based upon the slight rotation of shaft 36 mentioned herein, the arms of spring clip 38 will shortly be disposed within receiving grooves 102*a*, 102*b* and positive coupling will then exist between shaft 36 and supply reel 94. This furnishes supply reel 94 with direct rotational power from drive shaft 132 of motor 130.

In addition, the relevant geometry of elements such as shaft 36, spring clip 38, aperture 102, grooves 102*a*, 102*b* and reel 94, all contribute to the resultant position of reel 94 which will permit free rotational movement thereof with respect to its surrounding cartridge housing 30*c*. When cartridge 30 is lowered within loader 28, causing aperture 102 of supply reel 94 to be disposed around shaft 36, contact between the outwardly projecting opposed arms of spring clip 38 and the lowermost corner of interior flange 102 of supply reel 94 causes supply reel 94 to be elevated within cartridge 30. As is apparent from the ultimate position reached by cartridge 30, as illustrated in FIG. 4, the continued downward movement of cartridge 30 maintains reel 94 with a slight clearance with respect to both the bottom and top interior surfaces of cartridge housing 30*c*. Thus, as shown in FIG. 4, the only contact made by supply reel 94 with any other elements is that between (a) expanded spring clip 38 and grooves 102*a*, 102*b*, and (b) between supply reel outer flange 96 and surrounding ridge 42 of supply drive structure 34. Internal flange 100 is raised from depressed annular region 40 of supply drive structure 34, while there is a complete clearance space between the outwardly projecting elements of reel 94 and cartridge housing 30*c*. The clearance space is identified in FIG. 4 by numeral 30*d*.

4. Auxiliary Retention of Cartridge

Following the loading step, it has already been noted that loader 28 is retained in the lowered loaded position both by means of overlying locking lever 50 and, following the initial commencement of tap movement, by locking catch 68. When tape tension is applied by the sequential operation of microswitches 142 and 154, initial drive bias will be applied from supply reel motor 130 via its drive shaft 132 to rotate supply reel drive shaft 36. During this preliminary rotation as tape tension is applied to the system, supply reel 94 will rotate at least as far as is necessary to permit the opposed arms of spring clip 38 to expand into opposed receiving grooves 102*a*, 102*b* on the inner periphery of central aperture 102 of supply reel 94. In making this rotation, and in making the subsequent rotations which will occur during both supply and rewind as the system operates, supply reel 94 will obviously be rotating at considerable speeds with respect to its surrounding housing 30*c* of cartridge 30. In order to insure that the free rotational orientation of supply reel 94 is fully maintained and to prevent any unnecessary buffeting or undesired lateral or vertical movement of cartridge 30, the surrounding cartridge housing 30*c* is firmly retained in place by a pair of spring clips 46, shown in FIGS. 1 and 3 to be disposed at opposite corners of wall 44.

As noted in FIG. 5, as cartridge 30 is lowered towards tape deck surface 22, housing 30*c* comes into contact with curved portion 46*a* of spring clip 46. Spring clip 46 has a base portion 46*b* in contact with the upper surface 22 of tape deck 20 and which is fixedly mounted to that tape deck surface by a segment 44*a* of wall member 44. As cartridge 30 continues to be lowered, in loader 28, towards the surface 22 of tape deck 20, the lower outer corner of cartridge housing 30c comes into contact with internal retaining shoulder 44*b* of wall 44. Shoulder 44*b* acts as a stop against further downward movement of cartridge 30, and defines the height of loaded cartridge 30 above surface 22 of the tape deck. In the loaded position, the outer vertical edge of cartridge housing 30*c* compresses curved spring arm 46*a* towards wall 44, and spring arm 46*a* thus provides a retaining action with respect to cartridge 30 in the loaded position. As noted, this serves to insure that no undesirable movement of cartridge housing 30*c* takes place during the active cycle (i.e., either tape advance or rewind) of supply reel 94.

The height of shoulder 44*b* above tape deck surface 22, indicated as $h_1$ in FIG. 5, is identical to the height of the upper surface of the flange wheel of supply drive structure 34 above the same surface, identified as $h_2$ in FIG. 4. Specifically, the distance between the upper surface of surrounding ridge 42 of supply drive wheel structure 34 and upper tape deck surface 22, equals the distance between the upper surface of shoulder 44*b* and tape deck surface 22 (i.e., $h_1=h_2$). When outer flange 96 of supply reel 94 rests on ridge 42 as illustrated in FIG. 4, and the free rotational position has been achieved, the bottom of flange 96 will be in horizontal alignment with (but not touching) the lower surface of surrounding cartridge housing 30*c*. At the same time, shoulder 44*b*, on which cartridge housing 30*c* rests, insures that cartridge 30 will remain at the proper height such that the free rotational position of supply reel 94 is maintained.

II. OPERATION OF THE TAPE DECK SYSTEM

The following description indicates a typical cycle of the system of the invention as the tape cartridge is loaded onto the tape deck and various electronic and electromechanical responsive actions take place.

A. The Pre-Loaded Condition

Tape deck 20 is initially set up, prior to loading, as is generally illustrated in FIG. 1. Thus, loader 28 is in its elevated position, having been raised to that position by rotation clockwise from the position shown in FIG. 6 about pins 158*a*, 158*b* mounted in respective brackets 22*a*, 22*b* affixed to upper tape deck surface 22. Leader clasp 54 is positioned in its home slot 64 within guide block 48, with split post 62 in position to receive thereover eyelet 114 attached to recording tape 60T within cartridge 30. This receiving position for post 62 is assured by the action of lug 50*e*, which is at position 50*e'* in FIG. 9 when locking lever 50 is in the unlocked position. Tape leader 60, which may illustratively be of transparent mylar, is affixed to permanent leader clasp retaining post 56, and is threaded around the back of tape guide post 74, 76, past write and read heads 78 and 80 respectively, behind guide posts 82, 84 and around cylindrical roller (illustratively made of rubber) 88 of friction capstan 86 into take-up reel assembly 32. This path of leader 60 defines the subsequent path of the actual recording tape 60T during both forward and reverse movement of the tape when the system is operational.

B. The Depositing of the Cartridge in the Loader

Loader 28 receives tape cartridge 30 by the lowering of cartridge 30 into the position illustrated in FIG. 2. The view of FIG. 2 represents cartridge 30 within loader 28 as seen from the perspective of line 2—2 of FIG. 1 — thus, loader 28 is in the elevated position in which it is substantially vertical, and perpendicular to the plane of tape deck surface 22. (Actually, in order to permit loader 28 to remain stationary and stable with cartridge 30 therein, the elevated rest position of loader 28 may be slightly beyond the vertical.)

Cartridge 30 is lowered into the raised loader 28 with the one square corner of cartridge 30 pointing downwards as indicated in FIG. 2. As cartridge 30 moves downward between upper and lower tongues 90 and 92 respectively of loader 28, it ultimately comes to rest in the position shown in FIG. 2, with one of its straight side surfaces 106 resting against support arm 110 of loader 28, and the other straight side surface 108 resting against support arm 112. With this positioning, a portion of cartridge housing 30c fully occupies the space immediately behind clearance hole 122 in lower tongue 92 of loader 28. The depositing of cartridge 30 in loader 28 also establishes the concentricity of supply reel 94 with respect to clearance hole 160 in bottom tongue 92 of loader 28, as seen in FIG. 2. The portions of supply reel 94 which are to mate with drive structure 34 on tape deck surface 22 are thereby accessible for loading and mounting which will generally take place shortly after the cartridge has been deposited in the loader.

C. The Tape Deck Just Prior to Loading

With cartridge 30 having been deposited in loader 28 as shown in FIGS. 1 and 2, and just prior to the mounting step, the eleemnts on tape deck surface 22 appear substantially as they do in FIG. 1. Thus, locking lever 50 is in its unlocked position, with its surface 50a in position against rest stop 52 on guide block 48. Leader clasp 54 is precisely in its home slot 64 to permit alignment between split post 62 and eyelet 114 to which is attached recording tape 60T of cartridge 30. As briefly noted above, the precise home slot positioning of leader clasp 54 is guaranteed by the unlocked position of locking lever 50, since the resultant position of locking lever shaft 50*b* and attached lug 50*e* drives leader clasp 54 into a full and proper residence position in home slot 64. As seen in FIG. 9, the unlocked position of locking lever 50 is equivalent to the phantom position 50*e*′ of lug 50*e*, which is coupled to shaft 50*b*. The tip of lug 50*e* in position at 50*e*′ in FIG. 9 comes into contact with the base of leader clasp post 56 and forces leader clasp 54 to the far right end of home slot 64 as seen in FIG. 9. This arrangement compels split retaining post 62 to be in alignment with eyelet 114 which is to be lowered onto post 62 during mounting.

The presence of leader clasp 54 in home slot position 64 causes ramp element 66*b* of lever 66 to be depressed against the action of spring arm 146*a* of microswitch 146. Accordingly, lever 66 occupies the solid line position illustrated in FIG. 8, this maintaining microswitch 146 in the operated condition. The system electronics interprets this state of microswitch 146 to indicate that all of recording tape 60T is within cartridge 30 and that no rewinding should yet be permitted. Of the remaining electromechanical sensors, microswitch 142 is released, since pin 124 has not yet been depressed; microswitch 144 is similarly unoperated at this juncture, because pin 120 has not yet depressed srping arm 144*a*; and finally, microswitch 154 remains unoperated at this time, because of the unlocked position of locking lever 50, which causes arm 148, attached at the lower terminus of lever shaft 50*b*, to occupy the phantom position at 148′ in FIGS. 6 and 7. The unoperated conditions of microswitches 142 and 154 prevent the application of tape tension to the system, since both of these switches need to be closed for that step to take place.

In addition, the auxiliary locking catch 68, which will ultimately retain loader 28 in its horizontal loaded position (FIG. 6), is in the open or clearance position illustrated from above in FIG. 1. Thus, as loader 28 is lowered towards the horizontal loaded position, catch lip 126 of loader 28 will bypass the upper hook of catch 68 and move into position to receive catch 68 when clasp 54 moves out of home slot 64.

D. The Loading Step

Cartridge 30 having been deposited into loader 28, the actual loading of the cartridge on to tape deck 20 proceeds by rotating loader 28 counterclockwise about support brackets 22*a*, 22*b* which carry pins 158*a*, 158*b* respectively of loader 28. As loader 28 is thusly lowered towards tape deck surface 22, the first physical contact is made between the lowermost surface of supply reel 94 and the uppermost rim of supply drive structure 34 on tape deck 20. Specifically, when the lower inside edge of central aperture 102 of supply reel 94 comes into contact with the upper surface of drive shaft 36, supply reel 94 is preliminarily lifted from a position in which it rests on the lower inside surface of cartridge housing 30*c* to a position such that the reel makes contact with the inside upper surface of cartridge housing 30*c*.

As loader 28 continues to be lowered towards the horizontal position with respect to take deck surface 22 (FIG. 6), cartridge 30 is further lowered onto drive shaft 36, compressing spring clip 38 inwardly. Ultimately, loader 28 comes to rest by virtue of the contact between the bottom of cartridge housing 30*c* and shoulders 44*b* (FIG. 5), and between loader ribs 93 (FIG. 4) and the top of cartridge housing 30*c*. At this point, therefore, spring clip 38 is compressed into a dimension equivalent to the outer diameter of drive shaft 36. As described in more detail later, when locking lever 50 is turned clockwise until it occupies the position shown in FIG. 3, microswitch 154 is actuated and tension is applied to the tape. This causes rotation of reel 94 until the arms of spring 38 snap into a pair of grooves 102*a*, 102*b* and force the reel down onto hub 34. Accordingly, the only physical contact made by reel 94 in the mounted conditions is with drive structure 34, namely between spring clip 38 and the interior of central aperture 102, and between supply reel flange 96 and support ridge 42. Supply reel 94 is therefore in a position to receive only rotational forces, with no impeding action resulting from sliding or friction forces, for example, with its own housing 30*c*.

This portion of the loading step has resulted in the preliminary activation of two of the microswitches mounted to the undersurface 128 of tape deck 20. Initially, as loader 28 was lowered to surface 22, pin 124 mated with clearance hole 122 of loader 28. As shown in FIG. 8, the presence of cartridge 30 in loader 28 caused pin 124 to move from phantom position 124 in FIG. 8 to the full line position at 124′ in FIG. 8. This resulted in the depression of microswitch spring arm 142*a* by tip 124*a*, and hence depression of button 142*b* of microswitch 142. However, the initial operation of microswitch 142 is ineffective to achieve any other responsive action at this time.

Assuming that cartridge 30 contains recording tape 60T on which both the writing and reading functions are to be permitted, a "write enable" plug or pin 118 will have previously been inserted into write control cavity 116 in cartridge 30. During loading, write enable plug 118 will come into contact with pin 120 and will depress that pin against the urging of microswitch spring arm 144*a*. The resultant depressing of switch contact 144*b* will operate microswitch 144, thereby informing the system electronics that the character of the data, if any, contained on tape 60T in this cartridge 30 is such that writing (and thus the erasing of existing date) is to be permitted. On the other hand, if the existing data on tape 60T must be preserved, the write enable plug 118 will be omitted from control cavity 116. In that event, as loader 28 is lowered towards tape deck surface 22, control cavity 116 will clear pin 120 without contact therebetween, thereby causing microswitch 144 to remain in the unoperated condition. This will cause the system electronics to inhibit the writing function throughout the operation of the system with respect to this particular cartridge 30.

E. Initial Locking-in of the Loader

Once loader 28 has been lowered into the horizontal loading position illustrated in FIG. 6, locking lever 50 is then rotated 90° clockwise about its shaft **50*b* which is mounted through guide block 48 and tape deck surfaces 22 and 128, terminating at arm 148 beneath tape deck surface 128 (FIGS. 6, 7). The rotation of locking lever 50 is limited by stop 50*d* after lever 50 has passed over guide ramp 50*c*; when in the rest position illustrated in FIG. 4 (with the tension of spring 152 having been overcome), locking lever 50 resides in a slight depression in ramp 50*c*. When locking lever 50 assumes the locked position illustrated in FIG. 3, it overlies the upper surface of loader 28 and directly prevents loader 28 from being lifted from tape deck surface 22. This is the first mechanical locking feature of the invention which precludes accidental elevation of loader 28** once the system has become even partially operational.

F. The Electrical Response to the Initial Locking Step

As locking lever 50 moves to the locked position shown in FIGS. 3 and 4, its shaft **50*b* causes the rotation of right angle arm 148 from the phantom position at 148' to the full line position thereof at 148 in FIGS. 6 and 7. This movement, against the slight tension action of spring 152 (which also moves from the phantom position at 152' in FIG. 7 to the full line position at 152), brings the right edge surface of arm 148 into contact with the rear surface (in FIG. 6) of spring arm 154*a* of microswitch 154. This causes contact 154*b* of that switch to be depressed, and microswitch 154 is thereby operated. This step, coupled with the prior operation of microswitch 142,** results in the application of tape tension to the system.

Specifically, the system electronics thereby powers drive shafts 132 and 136 of supply and take-up reel motors 130 and 134 respectively to provide equal and opposite torques to supply reel 94 and to take-up reel 32 respectively. Because of the application of equal and opposite driving forces to the supply and take-up reels, no movement of tape leader 60 or recording tape 60T yet commences. However, it will be recalled that during loading, spring clip 38 was compressed into the diameter of shaft 36 as the shaft was captured within the internal surface of aperture 102 of supply reel 94. Spring clip 38 remains in this compressed condition until tape tension is applied to the system — at this point, a clockwise torque (from the perspective of FIG. 1) is applied to drive shaft 36, which will then rotate slightly to the point at which the opposed arms of spring clip 38 are aligned with receiving grooves **102*a*, 102*b* in the internal surface of central aperture 102. When such alignment occurs, the arms of spring clip 38 will expand into the grooves and thus establish a positive driving relationship between shaft 36 and supply reel 94, forcing reel 94 down onto hub 34 thereby bringing flange 96 into contact with surface 42. If a single pair of grooves 102*a*, 102*b* is employed, drive shaft 36 will have to rotate a maximum of 180° before the arms spring into position; if, for example, three pairs of equally spaced grooves are used, the rotation of shaft 36** will only need to be approximately 60°.

G. Tape Motion

The tape deck 20 is now prepared to receive instructions from the system electronics to control the tape movement.

1. Tape Advance

Drive motor 138 is energized and its drive shaft 140, coupled to friction capstan 86, supplies the driving movement (e.g., clockwise in FIG. 3) to advance the tape. The system electronics also supplies additional driving voltage for take-up motor 134 to insure steady tape pulling; however, a bias is also provided to supply reel motor 130, thus insuring the maintenance of proper tape tension.

As leader 60 begins to advance to the right in FIGS. 1 and 3, and is gradually wrapped around internal hub **32*a* of take-up reel 32, leader clasp 54 initially departs form its home slot position 64 and moves to the position indicated at 54' in FIG. 9. This movement is only permitted because of the clearance which was established when locking lever 50 was moved to the locked position indicated in FIG. 3 — this concurrently moved lug 50*e* to the full line position indicated in FIG. 9. This initial departure of leader clasp 54, with recording tape eyelet 114 attached to retaining post 62 therof, begins to withdraw tape 60T from cartridge 30. In so doing, cartridge latch 30*e*, which normally holds eyelet 114 secure, is then permitted to rotate counterclockwise about pin 30*f* under the urging of right angle spring 30*g*. The tape advance is facilitated by cartridge guide post 30*h*. When all the tape is later rewound onto supply reel 94, eyelet 114, mounted on split retaining post 62, forces latch 30*e* to rotate clcokwise about pin 30*f*, although eyelet 114, even when removed from post 62, cannot enter the interior of cartridge 30 and is thereby captured in the position illustrated in FIG. 9. The upper edge of latch 30*e* thereby forms a contiguous straight surface 108 for cartridge 30.**

When the initial tape advance causes leader clasp 54 to move out of the home slot 64 to the position indicated at 54' in FIG. 9, lever 66 assumes the phantom position at 66' in FIG. 8, under the upward urging of spring arm **146*a* of microswitch 146. Since there is no longer any upper obstruction against ramp edge 66*b* of lever 66, that edge moves to phantom position 66*b*' in home slot 64, with the downward leg of lever 66 moving to skew position 66*a*' as the microswitch arm goes to position 146*a*'. The upward movement of microswitch arm 146*a* causes microswitch 146 to release (i.e., contact 146*b*** moves upwardly) and the system electronics is informed that tape advance has commenced and that the rewind function should no longer be inhibited when rewind is subsequently desired.

The movement of lever 66 to position 66' in FIG. 8 also provides the auxiliary locking action furnished by catch 68 on loader 28. Thus, catch 68 rotates about pin 70 under the upward urging of integral lever arm **66*d*, which moves to position 66*d*' in FIG. 8. Pin 68*a* rides within hole 66*e* in bracket 66*d*, and as the lever arm assumes position 66*d*', catch 68 rotates in the direction indicated by the arrow in FIG. 10 and hooks into retaining position with lip 126 of loader 28. Loader 28 is thereby locked into the loaded horizontal position illustrated in FIG. 6, and even if locking lever 50 is erroneously moved to the unlocked position (e.g., as shown in FIG. 1), the auxiliary locking action of catc 68 will prevent loader 28 from being elevated from tape deck surface 22 as long as tape 60T has not been fully returned to cartridge 30 (indicated by the return of leader clasp 54 to home slot position 64). The return of leader clasp 54 will cause ramp edge 66*b*' of 66 to re-assume the full line position at 66*b* in FIG. 8, thereby unlocking catch 68 from lip 126 of loader 28.**

In the event that catch 68 inadvertently or improperly becomes linked with lip 126, thereby locking loader 28 to the tape deck (e.g., by the withdrawal of leader clasp 54 from home slot 64 before loading, followed by lowering loader 28 to tape deck surface 22), access may be had to catch 68 to manually unhook it from lip 126. For example, an attendant may correct such inadvertent locking by virtue of the provision of an aperture (not shown) in the upper plate of loader 28 to give direct access, through the loader, to catch 68 and lip 126, thus permitting disengagement of these two elements.

As recording tape 60T advances in the forward direction towards take-up reel 32, leader clasp 54, having moved from the position designated by 54 in FIG. 9 to the position 54' in FIG. 9 and then beyond in the direction of the arrow in FIG. 9, follows the path defined in FIGS. 1 and 3 by leader 60. Inner hub 32*a* of take-up reel 32 rotates in response to counterclockwise rotation of drive shaft 136, with leader 60 being wound around inner hub 32*a*. Outer take-up reel hub 32*c* remains stationary during this initial movement. When leader clasp 54 arrives at cut-out aperture 32*d*, it is captured therein, and forms a substantially circular circumference with the remainder of outer hub 32*c*. Moreover clasp 54 causes inner and outer hubs 32*a* and 32*c* respectively to thereafter rotate in tandem by having become lodged in the aperture formed by cut-out 32*d*. Accordingly, the counterclockwise drive power supplied by motor shaft 136 is thereafter effective to rotate both hubs of take-up reel assembly 32. Thus, all of the magnetic recording tape 60T which is accumulated on take-up reel 32 will be wound around outer hub 32*c* and will stack up above surrounding flange 32*e*, but will not make contact with the flange unless tension is released. As the tape is wound around hub 32*c*, it will also be wound around the opening created by cut-out 32*d* in which leader clasp 54 now resides. Recording tape 60T is therefore uniformly wound on outer hub 32*c*, with no "bumps" and without stretching or distorting the tape.

2. Tape Rewind

During the system operation, the writing function is achieved, under the control of the system electronics, by write head 78 which is in contact with the tape at head surface 78*a*; similarly, the reading function is achieved by head 80 at pickup surface 80*a*. When the reading and writing functions for any particular tape cartridge 30 have been completed, rewind is accomplished by removing the additional voltage which had been supplied to take-up reel motor 134, by applying such additional voltage to supply reel motor 130 and by reversing the direction of rotation of friction capstan motor 138. In response to the rewind instructions, supply drive hub 34 commences its rotation in the clockwise direction, and the concurrent counterclockwise rotation of friction capstan 86 results in the clockwise rotation of take-up reel 32, thus unwinding recording tape 60T which had been wound on outer hub 32*c*. Rewind continues, with tape 60T following the path indicated in FIGS. 1 and 3 around guide posts 84, 82, past heads 80 and 78 and finally past guide posts 76, 74 into supply reel 94 via home slot 64.

When leader clasp 54 ultimately arrives in home slot 64, retunring it to the position shown in FIG. 8 (and at the position indicated at 54, rather than 54', in FIG. 9), the upper ramp edge of lever 66 is depressed downward from the position at 66*b'* to that of position 66*b* in FIG. 8. This unlatches catch 68 from catch lip 126 of loader 28 and also depresses the srping arm of microswitch 146 from the position at 146*a'* to that of 146*a* in FIG. 8. The system electronics is thereby advised of the return of leader clasp 54 to home slot 64, and the rewind function is thereafter inhibited. The additional bias voltage furnished to supply drive reel motor 130 is removed and friction capstan 86 is brought to a halt. However, the tape tension applied to the system by virtue of the equal and opposite pulling forces furnished by motors 130 and 134 will remain until locking lever 50 is returned to its unlocked position, as illustrated in FIG. 1, which causes microswitch 154 to open.

H. Conclusion of Operation

When the system operation with respect to any cartridge 30 has been completed, following rewind, locking lever 50 is returned to its unlcoked position, removing tape tension from the system as mentioned above. Loader 28 can then be elevated from the loaded position of FIG. 6 to the substantially vertical unloaded position of FIG. 1. There are no restrictions to this elevation of loader 28, since catch 68 has been disengaged from lip 126, and locking lever has been removed from its locked position. With the loader 28 in its elevated position, cartridge 30 may be manually removed from the system by gripping serrated edges 30a, 30b, with the system thereafter being available for the loading in of additional cartridges.

It is to be understood that the foregoing description is merely illustrative of the application of the principles of the invention. Numerous other embodiments may be devised by those skilled in the art without departing from the spriit or scope of the invention.

What is claimed is:

1. A tape deck system for operating on recording tape comprising supply means for furnishing said tape to said system, take-up means for receiving said tape during the operation of said system, operating means disposed in the travel path of said tape between said supply means and said take-up means for performing said operating on said tape, drive means for controlling the movement of said tape between said supply and said take-up means, loading means for carrying said tape and movable between loaded and unloaded positions, said tape is contained in a cartridge, and wherein said loading means includes means defining a receiving cavity for said cartridge, said loading means further includes upper and lower plates each having opposed tongue regions spaced to define said receiving cavity, the inner surface of at least one of said tongue regions including a plurality of ribs for retaining said cartridge in said receiving cavity, said lower plate of said loading means includes an aperture allowing access from said supply means to said cartridge when said loading means is placed in said loaded position with respect to said tape deck system, said supply means includes a main hub and a drive shaft in contact with at least a portion of said cartridge when said loading means is in said loaded position, said contact being established through said access aperture, said cartridge includes an outer housing having an operating port, an internal supply reel for carrying said tape and normally resting on the inner surface of said housing, and wherein said supply means includes means for mating with said supply reel through said operating port to provide a clearance space between said supply reel and said housing when said loading means is in said loaded position, said supply reel includes an operative portion projecting through said operating port and including an outer flange and an inner flange, said inner flange defining a central aperture for said supply reel, and wherein said loading means is positioned on said tape deck for aligning said central aperture with said main hub as said loading means is moved from said unloaded position to said loaded position, said main hub includes an outer ridge adapted to receive said outer flange of said supply reel, and wherein said drive shaft includes spring means for establishing a freely rotatable driving relationship between said supply means and said supply reel, including a tape deck mounting plate and a locating wall mounted on said plate, said wall including at least one ledge for supporting said outer housing when said loading means is in said loaded position, and wherein the height of said outer ridge of said main hub above said tape deck mounting plate is substantially equal to the height of said supporting ledge above said mounting plate.

2. A tape deck system in accordance with claim 1 wherein said locating wall includes retaining means associated with said ledge for maintaining said housing of said cartridge fixed relative to said supply reel after said freely rotatable driving relationship has been established.

3. A tape deck system in accordance with claim 2 wherein said retaining means is a spring mounted in said locating wall.

4. A tape deck system for operating on recording tape comprising supply means for furnishing said tape to said system, take-up means for receiving said tape during the operation of said system, operating means disposed in the travel path of said tape between said supply means and said take-up means for performing said operating on said tape, drive means for controlling the movement of said tape between said supply and said take-up means, loading means for carrying said tape and movable between loaded and unloaded positions, said tape is contained in a cartridge, and wherein said loading means includes means defining a receiving cavity for said cartridge, including a deck surface for receiving said loading means in said loaded position, and wherein said deck surface has connected thereto alignment means for preventing said cartridge from being inserted in said receiving cavity in an improper orientation.

5. A tape deck system in accordance with claim 4 wherein said cartridge includes at least two substantially straight edge portions defining a substantially square corner therebetween, and wherein said alignment means includes a locating wall for blocking said loading means from reaching said loaded position by obstructing said square corner of said cartridge when said cartridge is lodged in said receiving cavity in said improper orientation.

6. A tape deck system in accordance with claim 5 including a locating block mounted on said deck surface and having a substantially square recess therein for receiving said substantially square corner of said cartridge when said cartridge is lodged in said loading means in a proper orientation.

7. A tape deck system for operating on recording tape comprising supply means for furnishing said tape to said system, take-up means for receiving said tape during the operation of said system, operating means disposed in the travel path of said tape between said supply means and said take-up means for performing said operating on said tape, drive means for controlling the movement of said tape between said supply and said take-up means, loading means for carrying said tape and movable between loaded and unloaded positions, including locking means for maintaining said loading means in said loaded position, said locking means includes movable means for allowing said loading means to be transferred from said unloaded to said loaded position and for selectively blocking said loading means from being transferred from said loaded to said unloaded position, said tape is contained in a cartridge and wherein said loading means includes at least one support plate defining a receiving cavity for said cartridge and having a clearance opening, and wherein said movable means includes a lever adapted to occupy an unlocked position with respect to said clearance opening as said loading means is transferred from said unloaded to said loaded position and adapted to occupy a locked position with respect to said clearance opening to retain said loading means in said loaded position, said support plate includes positioning means for guiding said lever between said unlocked and locked positions, said positioning means includes a guide ramp disposed along the travel path of said lever between said unlocked and said locked positions and a stop at the end of said travel path for limiting said lever in said locked position.

8. A tape deck system in accordance with claim 7 wherein said guide ramp includes a depression for receiving said lever in said locked position.

9. A tape deck system for operating on recording tape comprising supply means for furnishing said tape to said system, take-up means for receiving said tape during the operation of said system, operating means disposed in the travel path of said tape between said supply means and said take-up means for performing said operating on said tape, drive means for controlling the movement of said tape between said supply and said take-up means, loading means for carrying said tape and movable between loaded and unloaded positions, including leader means coupling said take-up means and said tape for guiding said tape between said supply means and said take-up means, and guidance means for establishing a home position for at least a portion of said leader means, said leader means includes a tape leader and a clasp adapted to couple said tape leader and said tape when said loading means is in said loaded position, and wherein said clasp normally resides in said home position prior to the commencement and subsequent to the completion of movement of said tape from said supply means, and wherein said guidance means includes control means responsive to the presence of said clasp in said home position for causing an output signal to be furnished to said drive means, said control means includes movable means responsive to the withdrawal of said clasp from said home position for securing said loading means in said loaded position.

10. A tape deck system in accordance with claim 9 wherein said loading means includes a catch lip and wherein said movable means includes a catch movable between a clearance position when said clasp is in said home position and a locked position engaging said catch lip when said loading means is in said loaded position and said clasp has been withdrawn from said home position.

11. A tape deck system in accordance with claim 10 wherein said control means further includes a first arm biased toward said home position and adapted to be displaced from said home position when said clasp is in said home position, and a second arm having an aperture therein, and wherein said catch has connected thereto a pin riding within said aperture and adapted to cause said catch to move from said clearance position to said locked position when said first arm moves into said home position.

12. A tape deck system for operating on recording tape comprising supply means for furnishing said tape to said system, take-up means for receiving said tape during the operation of said system, operating means disposed in the travel path of said tape between said supply means and said take-up means for performing said operating on said tape, drive means for controlling the movement of said tape between said supply and said take-up means, loading means for carrying said tape and movable between loaded and unloaded positions, said leader means includes a tape leader and a clasp adapted to couple said tape leader and said tape when said loading means is in said loaded position, and wherein said clasp normally resides in said home position prior to the commencement and subsequent to the completion of movement of said tape from said supply means, and wherein said guidance means includes control means responsive to the presence of said clasp in said home position for causing an output signal to be furnished to said drive means, including switch means for controlling the generation of said output signal and wherein said control means includes a first arm biased toward said home position and adapted to be displaced from said home position when said clasp is in said home position, and a second arm adapted to activate said switch means to cause said output signal to be furnished to said drive means when said clasp is in said home position and to release said switch means to remove said output signal when said first arm moves into said home position, said switch means includes a microswitch having an operating arm, and wherein said second arm of said control means is in contact with said operating arm to maintain said operating arm in a first activated position in response to said clasp residing in said home position and to permit said operating arm to move to a second released position in response to said first arm moving into said home position.

13. A tape deck system for operating on recording tape comprising supply means for furnishing said tape to said system, take-up means for receiving said tape during the operation of said system, operating means disposed in the travel path of said tape between said supply means and said take-up means for performing said operating on said tape, drive means for controlling the movement of said tape between said supply and take-up means, loading means for carrying said tape and movable between loaded and unloaded positions, including locking means for maintaining said loading means in said loaded position, leader means for coupling said take-up means and said tape for guiding said tape between said supply means and said take-up means, and guidance means for establishing a home position for at least a portion of said leader means, said locking means includes first movable means for securing said loading means in said loaded position and transferable between a clearance position as said loading means is moved from said unloaded to said loaded position and a locked position after said loading means is in said loaded position, and wherein said locking means further includes second movable means for governing the movement of said portion of said leader means and transferable between a blocking position when said first movable means is in said clearance position and an unblocked position when said first movable means is in said locked position.

14. A tape deck system in accordance with claim 13 wherein said leader means includes a tape leader and said portion of said leader means includes a clasp adapted to couple said tape leader and said tape when said loading means is in said loaded position, and wherein said second movable means includes a lug urging said clasp into said home position when said first movable means is in said clearance position, said lug being moved to said unblocked position to allow said clasp to be removed from said home position when said first movable means is in said locked position.

15. A tape deck system in accordance with claim 14 wherein said first movable means includes a lever adapted to limit movement of said loading means from said loaded position, and wherein said locking means further includes a shaft coupling said lever and said lug for concurrent movement.

16. A tape deck system in accordance with claim 13 including switch means for supplying an output signal to said drive means, and wherein said locking means further includes third movable means transferable between a rest position and an operative position for activating said switch means.

17. A tape deck system in accordance with claim 16 wherein said switch means includes a microswitch having an operating member and wherein said third movable means includes an arm adapted to be brought into engaging contact with said operating member as said first movable means is transferred from said clearance position to said locked position.

18. A tape deck system in accordance with claim 17 wherein said locking means further includes means for coupling said first, second, and third movable means together for concurrent movement.

19. A tape deck system in accordance with claim 18 wherein said coupling means includes a shaft common to each of said first, second and third movable means.

20. A tape deck system in accordance with claim 17 including resilient means for normally urging said third movable means into said rest position.

21. A tape deck system in accordance with claim 20 wherein said resilient means includes a spring.

22. A tape deck system for operating on recording tape comprising supply means for furnishing said tape to said system, take-up means for receiving said tape during the operation of said system, operating means disposed in the travel path of said tape between said supply means and said take-up means for performing said operating on said tape, drive means for controlling the movement of said tape between said supply and said take-up means, loading means for carrying said tape and movable between loaded and unloaded positions, including a deck surface for receiving said loading means in said loaded position, means connected to said deck surface for detecting the presence of said tape in said loading means and locking means for maintaining said loading means in said loaded position, said detecting means includes first switch means responsive to the transfer of said loading means to said loaded position for furnishing a first output indication, and wherein said locking means includes means movable between a clearance position and a locked position with respect to said loading means, second switch means responsive to the transfer of said movable means to said locked position for furnishing a second output indication, and wherein said drive means includes means for energizing said supply and said take-up means in response to the furnishing of both said first and said second output indications.

23. In a tape handling system comprising means for moving tape from one position to another position, the improvement comprising loading means movably connected to said system for inserting said tape into said system, said tape is contained in a cartridge, said loading means including a carriage for receiving said cartridge and adapted to be moved between unloaded and loaded positions, main locking means movable between a clearance position and a locked position to secure said carriage in said loaded position, auxiliary locking means responsive to the withdrawal of said tape from said cartridge to secure said carriage in said loaded position independent of said main locking means.

* * * * *